(12) United States Patent
Mohan et al.

(10) Patent No.: US 10,585,406 B2
(45) Date of Patent: Mar. 10, 2020

(54) BUILDING CONTROL SYSTEM TO OPERATE A BUILDING BASED ON CHARACTERISTICS OF SELECTED GROUPS OF BUILDING SENSOR FIXTURES

(71) Applicant: enLighted, Inc., Sunnyvale, CA (US)

(72) Inventors: Tanuj Mohan, Mountain View, CA (US); Vijayalakshmi Krishnamurthy, Sunnyvale, CA (US)

(73) Assignee: Enlighted, Inc., Sunnyvale, CA (US)

( * ) Notice: Subject to any disclaimer, the term of this patent is extended or adjusted under 35 U.S.C. 154(b) by 1073 days.

(21) Appl. No.: 14/852,506

(22) Filed: Sep. 12, 2015

(65) Prior Publication Data

US 2016/0004237 A1 Jan. 7, 2016

Related U.S. Application Data

(63) Continuation-in-part of application No. 13/740,205, filed on Jan. 13, 2013, now Pat. No. 9,323,233, which is a continuation-in-part of application No. 13/360,786, filed on Jan. 29, 2012, now Pat. No. 9,002,522.

(60) Provisional application No. 61/586,866, filed on Jan. 16, 2012.

(51) Int. Cl.
*G05B 15/02* (2006.01)
*H04L 12/28* (2006.01)
*F24F 11/30* (2018.01)
*F24F 11/62* (2018.01)

(52) U.S. Cl.
CPC .............. *G05B 15/02* (2013.01); *F24F 11/30* (2018.01); *F24F 11/62* (2018.01); *H04L 12/2816* (2013.01); *G05B 2219/2642* (2013.01)

(58) Field of Classification Search
CPC ............ F24F 11/30; F24F 11/62; G05B 15/02; G05B 2219/2642; H04L 12/2816
USPC ........................................................... 700/297
See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,437,596 B2 | 10/2008 | McFarland |

(Continued)

*Primary Examiner* — Duy T Nguyen

(57) ABSTRACT

Apparatuses, methods and systems of a building control system are disclosed. One building control system includes a plurality of building sensor fixtures, wherein at least one of the plurality of building sensor fixtures includes a sensor, a controller and a communication port. The building control system further includes a system controller. At least one of the system controller and one or more controllers of the plurality of building sensor fixtures is operative to determine a plurality of selected groups of the plurality of building sensor fixtures, compare a first characteristic between the plurality of the selected groups, and identify deviations of the compared first characteristic between the plurality of the selected groups.

20 Claims, 16 Drawing Sheets

(56) References Cited

U.S. PATENT DOCUMENTS

| | | |
|---|---|---|
| 7,382,271 B2 | 12/2008 | McFarland |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |
| 7,925,384 B2 | 4/2011 | Huizenga et al. |
| 8,344,660 B2 | 1/2013 | Mohan et al. |
| 8,457,793 B2 | 6/2013 | Golding et al. |
| 8,461,778 B2 | 6/2013 | Mohan et al. |
| 8,493,209 B2 | 7/2013 | Mohan et al. |
| 8,558,466 B2 | 10/2013 | Basil et al. |
| 8,587,219 B2 | 11/2013 | Mohan et al. |
| 8,587,225 B2 | 11/2013 | Ashar et al. |
| 2004/0002792 A1* | 1/2004 | Hoffknecht ............ G05B 15/02 700/295 |
| 2005/0169643 A1 | 8/2005 | Franklin et al. |
| 2005/0278047 A1 | 12/2005 | Ahmed |
| 2006/0170376 A1* | 8/2006 | Piepgras ............ E06B 3/6722 315/295 |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185597 A1 | 8/2008 | Veskovic et al. |
| 2008/0244104 A1 | 10/2008 | Clemente |
| 2008/0265796 A1 | 10/2008 | Null |
| 2009/0026966 A1* | 1/2009 | Budde ............ H05B 37/02 315/152 |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1* | 10/2010 | Chemel ............ H05B 37/029 315/294 |
| 2010/0270933 A1* | 10/2010 | Chemel ............ H05B 37/029 315/130 |
| 2010/0295482 A1 | 11/2010 | Chemal et al. |
| 2010/0301777 A1 | 12/2010 | Chemal et al. |
| 2011/0031897 A1 | 2/2011 | Henig et al. |
| 2011/0140612 A1* | 6/2011 | Mohan ............ H05B 37/0218 315/149 |
| 2011/0166710 A1* | 7/2011 | Kordik ............ H02J 3/14 700/277 |
| 2011/0199010 A1 | 8/2011 | Henig et al. |
| 2012/0126700 A1* | 5/2012 | Mayfield ............ H05B 37/0272 315/86 |
| 2012/0229049 A1* | 9/2012 | Mohan ............ H05B 37/0245 315/307 |

* cited by examiner

Designating the building fixture as belonging to a logical group of building fixtures, wherein the designating comprises at least one of receiving the designation or the building fixture aiding in the designation

910

Independently controlling, by the building control fixture, at least one of an environmental load or a security device

920

Sharing, by the building control fixture, at least one of sensor or state information with other building fixtures within the logical group of building fixtures, through a communication port of the building control fixture

Each of a plurality of independently controlled lighting fixtures sensing light and/or motion, and independently controlling an intensity of light of the lighting fixture

1510

Specifying one or more of the plurality of independently controlled lighting fixtures as belonging to a logical group

1520

Each of the lighting fixtures of the logical group additionally controlling the intensity of light of the lighting fixture based on sensing of light and/or motion of another lighting fixture of the logical group

```
┌─────────────────────────────────────────────────────────────────────────┐
│ Each of a plurality of independently controlled temperature apparatuses │
│ sensing light, motion and/or temperature, and independently controlling │
│ a temperature                                                           │
│                              1610                                       │
└─────────────────────────────────────────────────────────────────────────┘
                                    │
┌─────────────────────────────────────────────────────────────────────────┐
│ Specifying one or more of the plurality of independently controlled     │
│ temperature apparatuses as belonging to a logical group                 │
│                              1620                                       │
└─────────────────────────────────────────────────────────────────────────┘
                                    │
┌─────────────────────────────────────────────────────────────────────────┐
│ Each of the temperature apparatuses of the logical group additionally   │
│ controlling temperature based on sensing of light, motion and/or        │
│ temperature of another temperature apparatus of the logical group       │
│                              1630                                       │
└─────────────────────────────────────────────────────────────────────────┘
```

FIGURE 16

BUILDING CONTROL SYSTEM TO OPERATE A BUILDING BASED ON CHARACTERISTICS OF SELECTED GROUPS OF BUILDING SENSOR FIXTURES

RELATED APPLICATIONS

This patent application is a continuation-in-part (CIP) of U.S. patent application Ser. No. 13/740,205, filed on Jan. 13, 2013, titled "Building Load Reduction During Demand Response", which is a continuation-in-part (CIP) of U.S. patent application Ser. No. 13/360,786, filed on Jan. 29, 2012, titled "Logical Groupings of Intelligent Building Structure", and claims priority to U.S. provisional patent application Ser. No. 61/586,866, filed on Jan. 15, 2012, which are herein incorporated by reference.

FIELD OF THE EMBODIMENTS

The described embodiments relate to control systems. More particularly, the described embodiments relate to apparatuses, methods and systems of a building control system.

BACKGROUND

Building or building structures can be equipped with building sensor fixtures. The building sensor fixtures can be utilized to sense and control an environment (such as, temperature and lighting) of the buildings or building structures. The data from the sensors can provide information about the building or building structure, such as, energy consumption, occupancy pattern, occupant preferences, resource utilization etc.

It is desirable to have methods, systems and apparatuses for a building control system. It is desirable that the building control system utilize the data from building sensors to determine methods for effectively operating the building.

SUMMARY

One embodiment includes a building control system. The building control system includes a plurality of building sensor fixtures, wherein at least one of the plurality of building sensor fixtures includes a sensor, a controller and a communication port. The building control system further includes a system controller. At least one of the system controller and one or more controllers of the plurality of building sensor fixtures is operative to determine a plurality of selected groups of the plurality of building sensor fixtures, compare a first characteristic between the plurality of the selected groups, and identify deviations of the compared first characteristic between the plurality of the selected groups.

Another embodiment includes a method of a building control system. The method includes determining a plurality of selected groups of a plurality of building sensor fixtures, comparing a first characteristic between the plurality of the selected groups, and identifying deviations of the compared first characteristic between the plurality of the selected groups.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a flow chart that includes steps of an example of a method of operating a building control fixture according to an embodiment.

FIG. 15 is a flow chart that includes steps of another example of a method of an intelligent light controller controlling a light.

FIG. 16 is a flow chart that includes steps of another example of a method of an intelligent light controller controlling a light.

DETAILED DESCRIPTION

The described embodiments are embodied in an apparatuses, systems and methods of a building control system.

Figure 1:
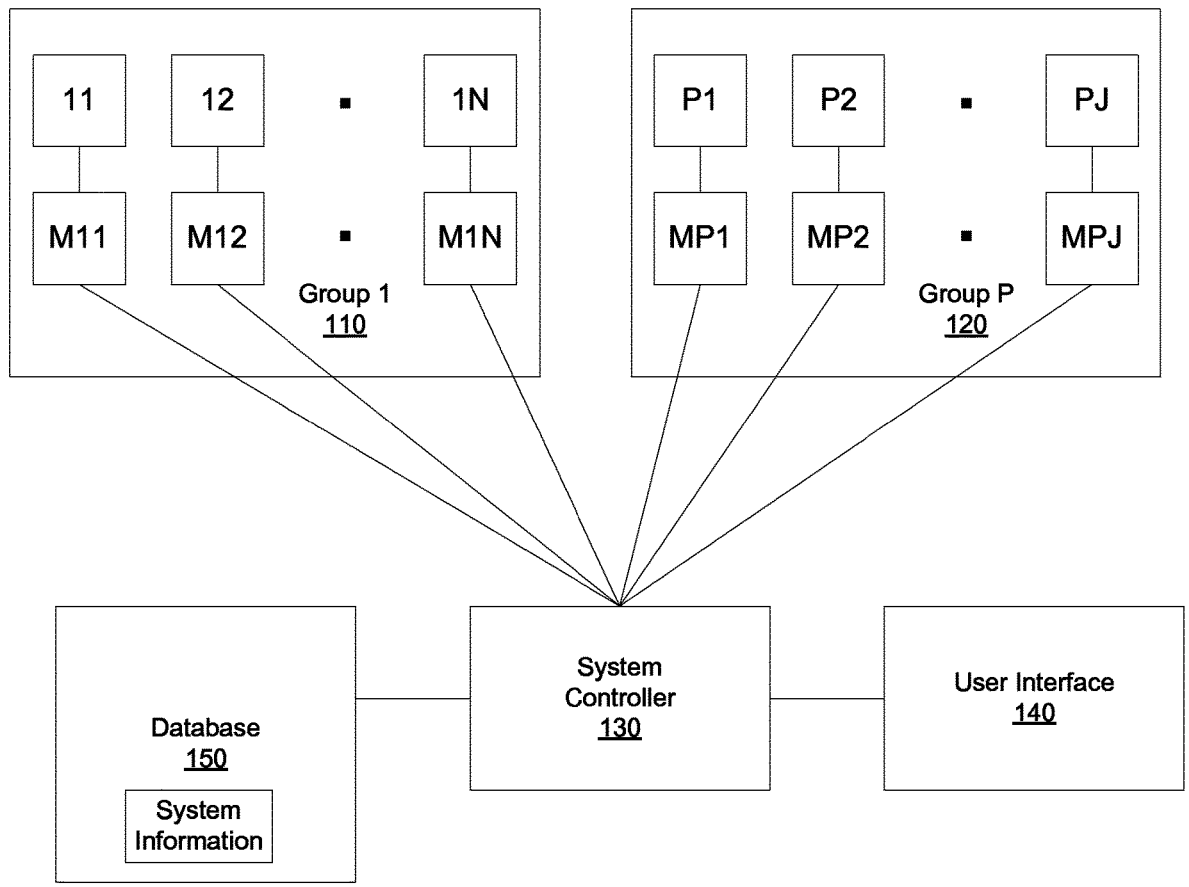
FIG. 1 shows a building control system, according to an embodiment.

FIG. 1 shows a building control system, according to an embodiment. This embodiment includes multiple logical groups 110, 120, wherein each logical groups includes one or more loads. A first logical group 110 includes N loads 11, 12, 1N, and a Pth logical group 120 includes M loads P1, P2, . . . PJ. There could be different number of loads in each group. For this embodiment, each of the loads is connected to a building sensor fixture M11-M1N, . . . , MP1-MPJ.

For at least some embodiments, one or more building sensor fixture performs one or more measurement functions including measurement of the power consumed by the corresponding load, sensing the motion (occupancy) in proximity of the load, measuring the ambient light, ambient temperature, ambient Carbon Dioxide ($CO_2$) levels, etc. Additionally, for at least some embodiments, one or more building sensor fixtures control the load to which it is connected. For an embodiment, this translates into controlling the intensity of the light (in case of lighting loads), the volume/temperature of the air (in the case of an HVAC load) and so on.

Finally, an embodiment of the building sensor fixture communicates bi-directionally with a system controller 130 over a communication network, which could be a wired or wireless network. While shown as a separate controller, it is to be understood that for at least some embodiments, the system controller 130 is at least partially distributed amongst one or more controllers of the building sensor fixtures.

As shown, the building control system of FIG. 1 includes the plurality of building sensor fixtures (M11 through MPJ). Further, for at least some embodiments, at least one of the plurality of building sensor fixtures includes a sensor, a controller and a communication port.

For at least some embodiments, at least one of the system controller 130 and one or more controllers of the plurality of building sensor fixtures is operative to determine a plurality of groups of the plurality of building sensor fixtures, compare a first characteristic between the plurality of the selected groups, and identify deviations of the compared first characteristic between the plurality of the selected groups.

Further, at least some embodiments further include adjusting an operating parameter of one or more of the plurality of selected groups based on the identified deviations. That is, based on the identified deviations of the compared first characteristic, the system controller 130 and/or the controllers of the building control sensors proactively (which as described, for at embodiment adaptively) adjusts an operating parameter of one or more of the plurality of selected groups.

Further, at least some embodiments include providing a system user with suggestions for physical changes to a structure associated of one or more of the plurality of selected groups based on the identified deviations. That is, based on the identified deviations of the compared first characteristic, the system controller 130 and/or the controllers of the building control sensors proactively (which as described, for at embodiment adaptively) provide a system user with suggestions for physical changes to a structure associated with one or more of the plurality of selected groups.

Identified Deviations

For at least some embodiments, the identified deviation includes a deviation of energy (wherein the first characteristic is consumed energy) consumed by one of the plurality of selected groups compared to another of the plurality of selected groups. For an embodiment, identified deviations include sensing energy consumption of one group being greater than energy consumption of another group of greater than a threshold. For different embodiments, the deviation included energy consumed by lighting, HVAC, plug load, specific circuit related to lab/office assets etc. of the different groups.

The variations of the energy consumed between the groups can be due to several different characters of the different groups, for example, physical locations of each of the groups. That is, for an embodiment, the deviation of energy consumed by a group is dependent upon the physical location of the group. The different groups can be located proximate to sun light and/or other heat sources.

Additionally, or alternatively, the variations of the energy consumed between the groups can be due to the personal (users) associated with each of the groups. Exemplary occupation characteristics (in terms of type of occupancy defined by physical characteristic such as marketing/call center, assigned space information such as expected number of occupants and expected foot traffic etc), rhythm of building use (in terms of times of occupancy, density of occupancy over time and space etc), latitude/longitude of building & its corresponding weather pattern etc.

For at least some embodiments, the identified deviation includes a deviation of occupancy use of one of the plurality of selected groups compared to another of the plurality of selected groups. For example, patterns of use of building assets (such as door, telecommunication equipment, display equipment, café assets, printing equipment, lab/test/manufacturing equipment, badging equipment, ambience creation usages related to lighting/HVAC modifications via physical switch or app etc.) can be different and measurable between groups.

For at least some embodiments, the identified deviation includes a deviation of productivity of occupants of one of the plurality of selected groups compared to productivity of occupants of another of the plurality of selected groups.

For at least some embodiments, the identified deviation includes a deviation of occupant interaction of one of the plurality of selected groups compared to occupant interaction of occupants of another of the plurality of selected groups. For an embodiment, the occupant interaction is between occupants within the group. For an embodiment, the occupant interactions are between occupants and devices within the group. For an embodiment, the deviation of occupant interaction includes at least a pattern of occupant group interactions (such as interaction measure of marketing-sales team members, marketing-engineering team members etc.). For at least some embodiments, the pattern of occupant group interactions includes at least a rhythm of an occupant in the building versus a goal of the user (such as the goal of achieving a well-attended meeting filled day, goal of completing undisturbed individual contribution day or period, goal of working in a team at high efficiency by not wasting time to look for team members, walking times etc., goal of finding the right asset/person(s) in real time for accomplishing results such as customer service employee finding right people/asset to help or finding the executives for the impromptu visitor engagement etc.).

For at least some embodiments, the identified deviation includes a deviation of utilization of space of one of the plurality of selected groups compared to utilization of space of occupants of another of the plurality of selected groups. For at least some embodiments, characteristics related to a utilization level of space (including times of usage, time based pattern of usage such as infrequent long usage versus frequent short usages, density of usage over time), type of occupant trail formed over the space over time, usage of common area by occupants and by asset movers (café, gym, lobby, elevator, entry ways etc) and their rhythm of use in terms of time and density, dependent area usage patterns in terms of density and time lag between their use (such as lobby to private office, conference room to open office, parking lot to lobby etc.).

At least some embodiments further account for infrequent or rare even event effects on energy consumption, space usage and occupant interactions over time and across building portfolio. Examples of infrequent or rare even event include heavy snow day, Thanksgiving weekend, Superbowl day, Quarterly earnings call day (days leading up to it), Sales meeting day, Town hall events etc. For at least some embodiments, infrequent or rare even event are accounted for by at least one of times of occupancy of the space, periods of use, density of occupancy, pattern of building resource and equipment use, types of temporary resources/equipment utilized etc.

Adjusting an Operating Parameter

After having identifying deviations of the compared first characteristic between the plurality of the selected groups, at least some embodiments further include adjusting an operating parameter of one or more of the plurality of selected groups based on the identified deviations. For at least some embodiments, adjusting the operating parameters includes reducing light intensity to save energy, or increasing light intensity to increase productivity.

At least some embodiments include characterizing the identified deviations into groups. A first group includes beneficial deviations that help to achieve better energy efficiency, space usage and occupant interactions. A second group includes detrimental deviations that prohibit a space or building to achieve its goal of energy/space usage/occupant goal. A third group includes anomalistic deviations that result from mis-data read/record/processing.

Beneficial Deviations

For at least some embodiments, beneficial deviations are used for preparing the building or structure for better energy consumption or space usage or occupant interaction or a combination thereof. For at least some embodiments, adjusting the operating parameters for an identified beneficial deviation includes adjusting a room (for example, within a building, a private office and/or a conference room) temperature prior to expected occupancy to prepare for occupant rhythm, adjusting lighting to create ambience for scheduled events such as meeting/teleconference etc., changing light/HVAC system up-down times to adapt to occupancy density across spaces (avoiding hot/cold islands, dark/bright islands due to specific occupancy pattern, lighting up expected path ways based on occupant's expected foot traffic trail etc), adjusting the parameters of auxiliary systems such as Building Management System, Door, Office equipment, Café assets, Gym assets etc. based on identified beneficial deviations to help serve occupants better etc.

Detrimental Deviations

For at least some embodiments, detrimental deviations are identified for enabling the building or structure to achieve a desired result on energy consumption or space usage or occupant interaction or a combination thereof. For at least some embodiments, adjusting the operating parameters for an identified detrimental deviation include modifying of light on-off times to the window that is in-tune with occupancy characteristic, modifying of HVAC system parameters for better efficiency based on occupancy density over time, modification of availability of hoteling spaces that can be reserved based on occupancy level characteristic to avoid sporadic occupancy of large space, modification of plug load or auxiliary system parameters (such as Building management system or parameters of software in systems connected to plug load or leaf node sensors in our network that controls office assets etc.) to enable the building to serve the occupant better based on observed characteristic.

Anomalistic Deviations

At least some embodiments include anomalistic deviations. For at least some embodiments, the anomalistic deviations aid in understanding characteristics that lead up to the anomaly and the parameters of sensors/leaf nodes/building management systems etc. that can be updated/adjusted to avoid anomaly in the future.

Suggested Physical Changes

For at least some embodiments, once the deviations been identified, a system user is provided with suggestions for physical changes to a structure associated with the building control system based on the identified deviations. For an embodiment, the suggested physical changes improve the use of the structure based on the identified beneficial or detrimental deviations.

Exemplary suggested physical changes based on identified beneficial deviations include office design changes, café/gym time changes, parking lot modifications, private office-conference room redesign, entry way changes etc. From occupant usage perspective, beneficial deviations could result in co-location of team members to achieve the business goal, avoidance of proximity to foot traffic area for focused individual contributor, enabling mobile/hoteling/permanent space based employee recommendations etc. From occupant interaction perspective, beneficial deviations could help to recommend the need for additional café/gym/office equipment based on the crowding of users wasting time in queue, decision on how common area such as café operates over the day for smooth occupant service (such as operating hour window modifications, number of service agents etc.).

Exemplary suggested physical changes based on identified beneficial deviations include modifying office designs that are prohibiting occupant interaction and optimized space usage such as redesign of entry way, conversion of private offices to open office etc. For an embodiment, suggested physical changes based on detrimental deviations include creating new type of spaces such as hangout areas for impromptu meetings or enlarged café spaces etc. Suggested physical changes based on detrimental deviations can help to remove or replace some of the under-utilized but over-energy consuming assets. Suggested physical changes based on detrimental deviations can help to decide entry way changes, badging system changes, parking lot changes to avoid long queue in common areas.

Exemplary suggested physical changes based on identified anomalistic deviations include helping to decide and physically correct improper location of a sensor (such as the sensor is facing a light source or a vent that prohibit it from proper operation), leaf nodes (such as sensors that needs observation of space is behind an asset or inside the asset etc.), identify and correct limitations of controlling systems such as building management system by deploying additional systems (such as current deployment cannot control outdoor spaces and hence, the outdoor anomalies can be addressed only by deploying a separate system that works with building management system).

For at least some embodiments, the first characteristic is dynamically selected. For at least some embodiments, selecting the first characteristic is based on achieving a desired result within a building associated with the building control system. For at least some embodiments, the first characteristic is adaptively selected based on the determined plurality of groups of the plurality of building sensor fixtures.

For at least some embodiments, determining the plurality of groups of the plurality of building sensor fixtures includes selecting the plurality of groups based on one or more second characteristics. For at least some embodiments, the secondary characteristics are a set of parameters that have the potential to influence the first characteristic, wherein the first characteristic is selected to achieve a desired result, such as, energy consumption, space usage and occupant interaction. For example, if the first characteristic is lighting energy consumption, the secondary characteristic may include wattage of a fixture, a minimum light level achievable, occupancy pattern, daylight sensing data distribution etc. If the first characteristic is occupancy density of an area, secondary characteristics could include entryways to the space, shape of pathways for in-space navigation, type of people assigned to space if applicable, occupancy pattern of those assigned occupants over time/day etc. If the first characteristic is occupant interaction with an asset then secondary characteristics could be type of asset being worked with, restricted or open use asset, capability of asset for delivering multiple uses etc. If the first characteristic is occupant group interaction then secondary characteristics could be distance between the occupant members, occupants' proximity to foot traffic/conference room etc., occupant groups' occupancy pattern over time/day etc.

For at least some embodiments, the second characteristic is selected based on achieving a desired result within a building associated with the building control system. For at least some embodiments, selection of the second characteristic based on achieving a desired result includes a specific % reduction in lighting or HVAC or plug load energy consumption, and/or a specific increase in average occupancy per square foot or specific decrease in occupancy traffic per square foot of common area. For example, if the desired result is 10% reduction in total HVAC energy consumption across multiple buildings in portfolio, the secondary characteristic could include location of the building, weather pattern, heating days, cooling days, types of HVAC equipment, type of building and insulation material/methods, occupancy hours, types of occupancy such as manufacturing or call center etc.

For at least some embodiments, the second characteristic is selected based upon observed correlations between sensed values of each of the plurality of building sensor fixtures. For an embodiment, the observed correlations are based on collected samples that are identified by building sensor fixture location and the time each sample was sensed.

For at least some embodiments, the second characteristic is selected based upon identification of operating behaviors of each of the building sensors of each group being within threshold ranges. For at least some embodiments, the identified operating behaviors include kWh of energy consumption per building sensor fixture greater than a specific value, a kWh per square foot of space exceeding a specific value, a difference between number of occupants versus assigned occupants for a space exceeding specific value etc.

For at least some embodiments, the second characteristic is selected based upon the first characteristic. For at least some embodiments, the first characteristic is selected to achieve a desired result. For at least some embodiments, the first characteristic is adaptively selected based on the secondary characteristic of the group. When the improvement (Vs. goal) has achieved the desired result, a new group is formed based on an additional set of secondary characteristics. For example, if the first characteristic is lighting energy consumption and the secondary characteristic is time-in of early occupant and time-out of last occupant over the day for many days. By assessing the deviation of lighting energy consumption (first characteristic), and its dependency to the second characteristic, action can be taken to affect that deviation. That is, for example, time-in of early occupant and time-out of last occupant can influence the deviation of lighting energy consumption between groups. Therefore, by taking an action of relocating individuals that have similar time-in and time-out to similar locations, the deviation of the first characteristic can be reduced.

First Characteristic Selection

For at least some embodiments, the first characteristic is selected by a user. For an embodiment, the first characteristic is selected by the user via a user input, wherein the user input is selected to achieve of a global objective of the building management. For an embodiment, global objective includes a ranked set of goals. Example, for an embodiment, the goals of the global objective are ranked as 1. a total energy consumption, 2. the number of occupants per square foot, 3. an occupancy time window of the building. For an embodiment, if the global objectives listed above are provided by the user, the first characteristic is selected to minimize energy consumption. Exemplary first characteristic can include, for example, lighting energy consumption, HVAC energy consumption, plug load consumption, peak hour consumption, non-occupant hour consumption etc. After the energy consumption related first characteristic is addressed with changes that optimize the energy consumption, the next choice of first characteristic can be related, for example, to the number of occupants per square foot. This iterative process guides the building control system through a series of optimizations to improve management of the building.

For at least some embodiments, the first characteristic is selected based upon the second characteristic. For example, for the example provided above, the occupancy window can be the second characteristic. The second characteristic helps to select first characteristic among, for example, lighting energy consumption, HVAC energy consumption, plug load energy consumption, occupancy density, occupant group interaction etc.

For at least some embodiments, the second characteristic is a same characteristic as the first characteristic. For example, for an embodiment, the first characteristic comprehensively defines the types of groups for improvement. For example, if the goal is to minimize the light ramp time between specific dimming levels, the first and second characteristics are same and it is light ramp up time. The groups are formed based on this ramp up time and those groups with large ramp up times are addressed for improvement.

For an embodiment, the controller 130 is connected to a Database 150 which is capable of storing System Information. For an embodiment, a User Interface 140 is used to enter or modify the System Information stored in the Database 150.

Figure 2:
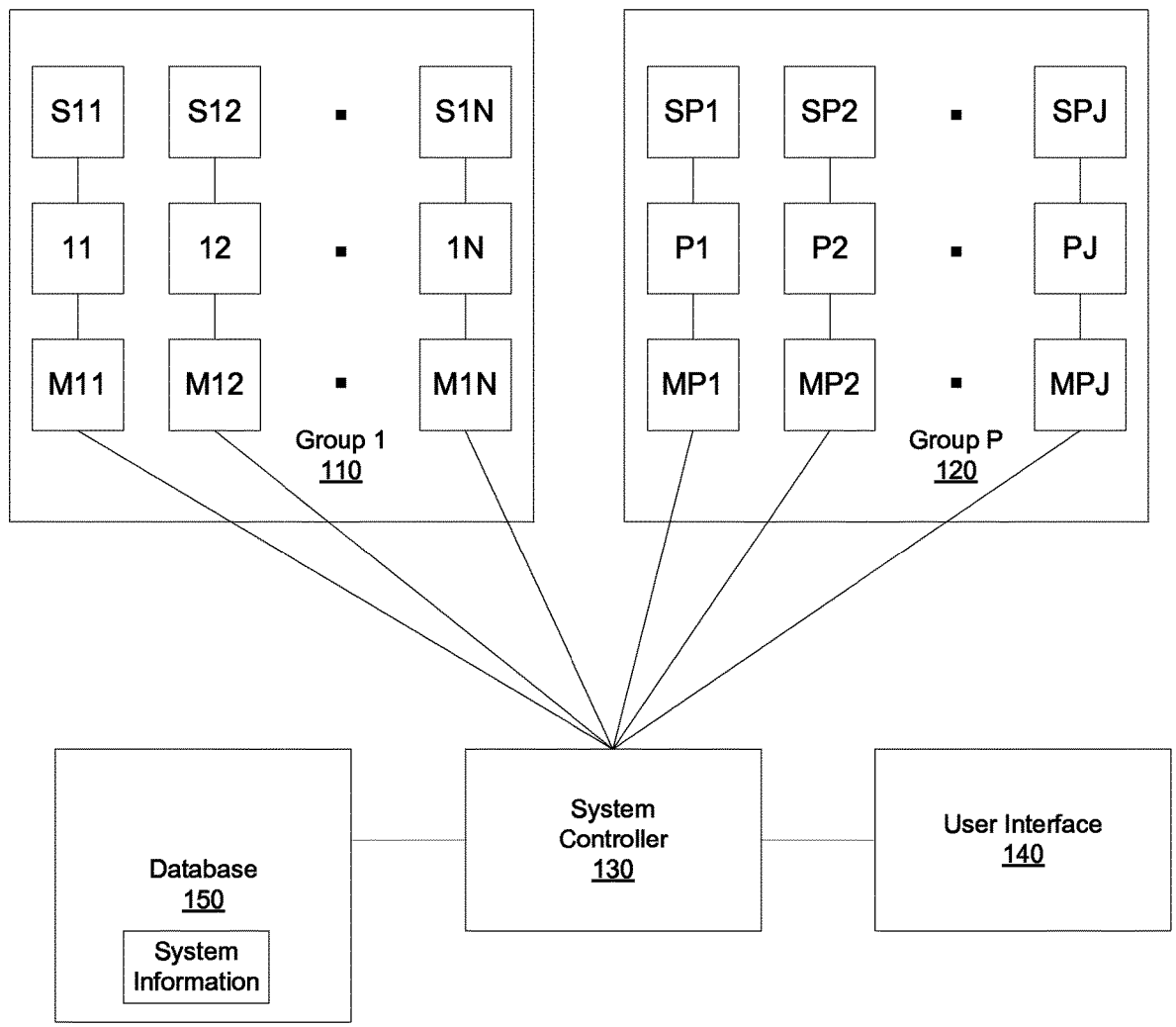
FIG. 2 shows a building control system, according to another embodiment.

FIG. 2 shows a system for managing a building load reduction of a plurality of loads, according to another embodiment. This embodiment is similar to the embodiment of FIG. 1, but further depicts each of the loads having a sensor for sensing a parameter. As described, the sensors sense a parameter that for some embodiments is used to further adjust a power load of one or more of the loads.

For an embodiment, the sensor includes an occupancy sensor, such as a motion sensor. Further, the occupancy sensors allow for adjusting the electricity of various different types of load including lighting, HVAC and plug-loads. Upon detecting vacancy, lights can be turned off or dimmed, HVAC can be setback and certain plug-loads such as computer monitors, task lights etc. can be turned off.

For at least some embodiments, the sensor includes a temperature sensor and a CO2 sensor. The temperature and/or CO2 sensors along with occupancy sensors can be utilized to help optimize the HVAC savings.

Ambient light sensors allow for lighting loads to leverage ambient light and during DR events do so more aggressively. Ambient light sensors can also be leveraged to detect occupancy.

Figure 3:
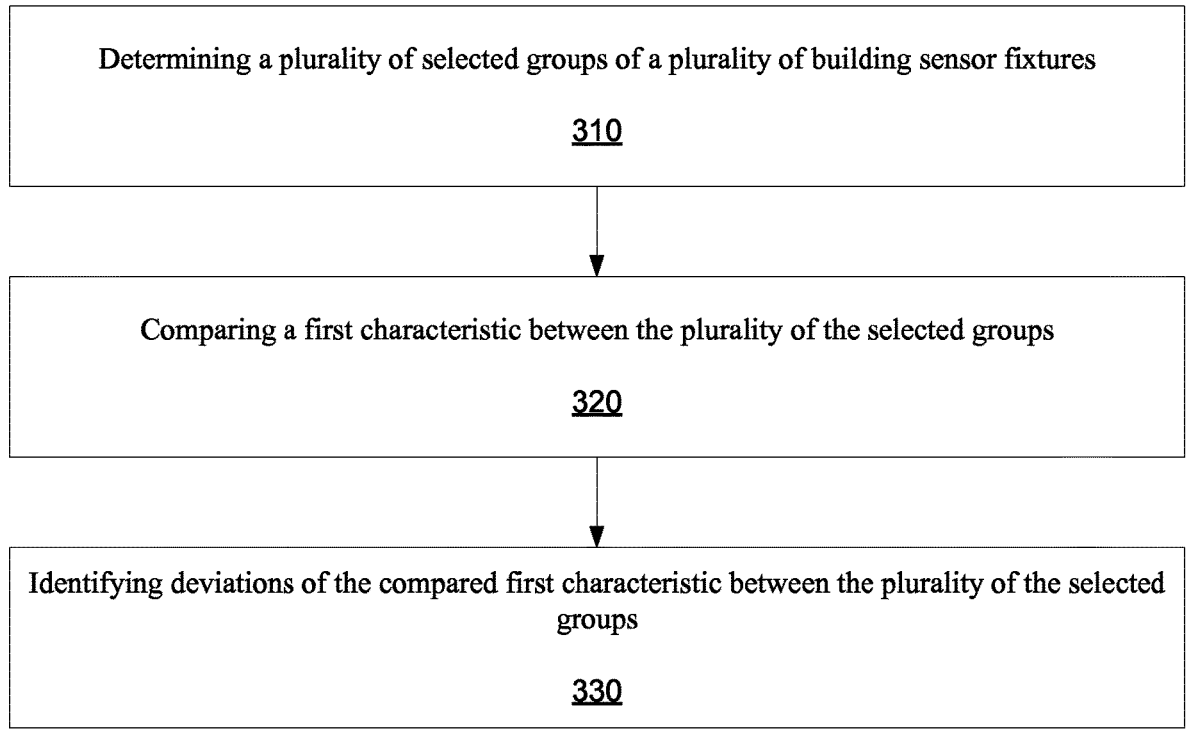
FIG. 3 is a flow chart that includes steps of a method of operating a building control system, according to an embodiment.

FIG. 3 is a flow chart that includes steps of a method of operating a building control system, according to an embodiment. A first step 310 includes determining a plurality of selected groups of a plurality of building sensor fixtures. A second step 320 includes comparing a first characteristic between building sensor fixtures of the plurality of the selected groups. A third group 330 includes identifying deviations of the compared first characteristic between building sensor fixtures of the plurality of the selected groups.

Figure 4:
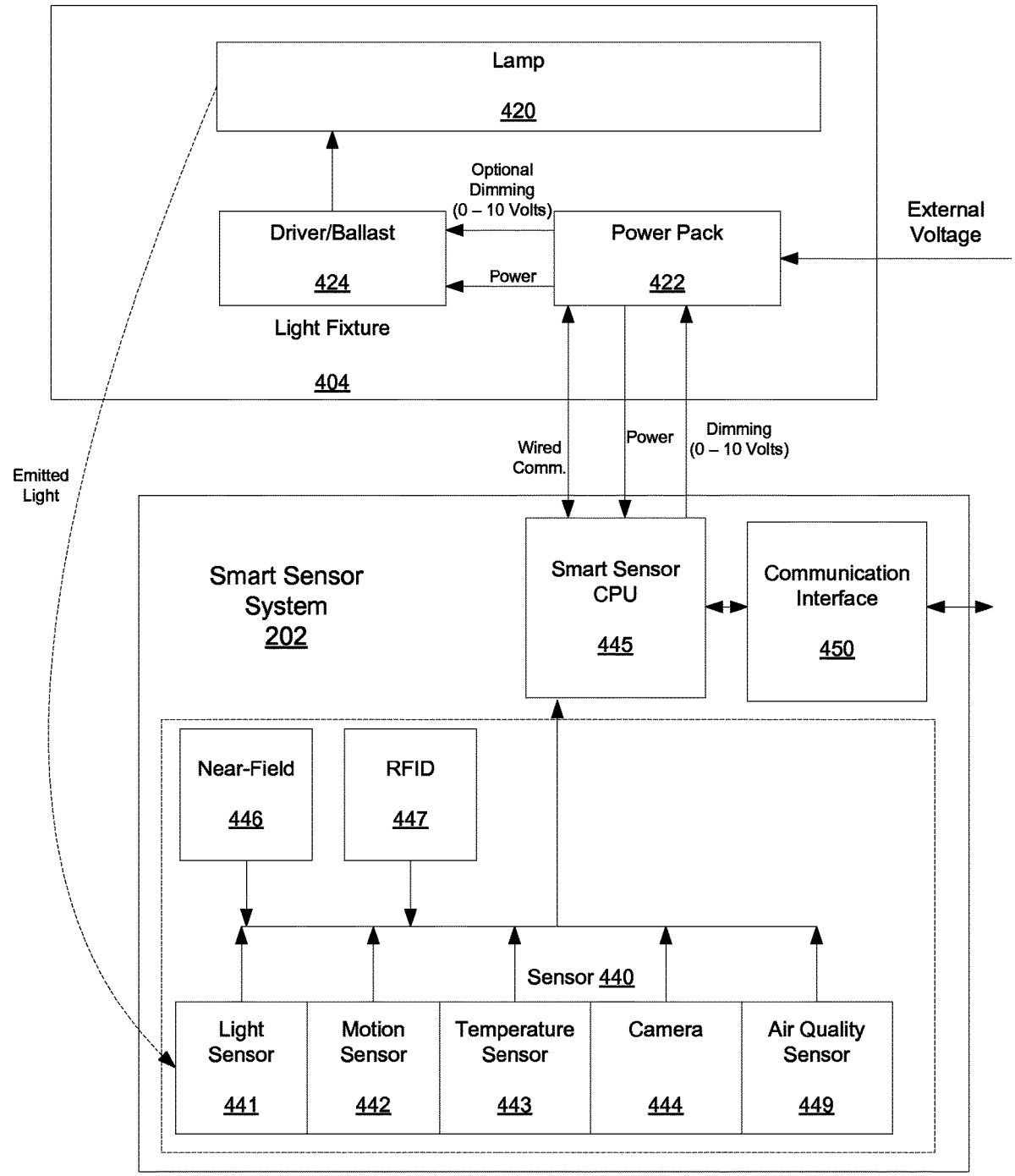
FIG. 4 shows a load, according to an embodiment.

FIG. 4 shows a load, according to an embodiment. The load of FIG. 4 includes an intelligent light fixture. Here, the intelligent light fixture includes a light fixture 404 and a smart sensor system 402. For this embodiment, the light fixture 404 includes a lamp 420, a driver 424 and a power pack 422.

The power pack 422 receives an external voltage which provides power to the light fixture 404 and the smart sensor system 402. Additionally, the power pack 422 receives dimming control from the smart sensor system 402. Based on control information from the smart sensor system 402, the power pack 422 provides dimming control (again, the dimming control is optional) and power to the driver 424. The driver 424 can include an LED driver, or a florescent light ballast.

The driver 424 controls the applied voltage or current to the lamp (light) 420 which controls an intensity of light emitted from the lamp 420. As described, the lamp can include any type of light, such as, LED, incandescent, HID, or florescent.

The emitted light is received by a light sensor 441 of the smart sensor system 402. For an embodiment, a smart sensor CPU 445 of the smart sensor system 402 monitors the received light intensity. Additionally, for at least some embodiments, the smart CPU 445 controls the dimming of the lamp 420. By being able to control the lamp 420 and monitor the emitting intensity of light from the lamp 420, the smart sensor system 402 is able to monitor the power usage of the lamp 420, and monitor the health of the light fixture 404.

As shown, the smart sensor system 402 includes a sensor 440 that includes, for example, the light sensor 441 (for example, an ambient light sensor), a motion sensor 442, a temperature sensor 443, a camera 444, an air quality sensor 449, a near-field sensor 446, and/or an RFID sensor 447. The sensor 440 provides the sensed information to the smart sensor CPU 445.

For an embodiment, the smart sensor CPU 445 monitors sensed parameters as provided by one or more of the sensors connected to the smart sensor CPU 445. The smart sensor CPU 445 can then directly adjust the power load of the intelligent light fixture, or communicates the sensor information through, for example, the communication interface 450, to another controller, thereby allowing the power load of the load (intelligent light fixture) to be adaptively adjusted.

Figure 5:
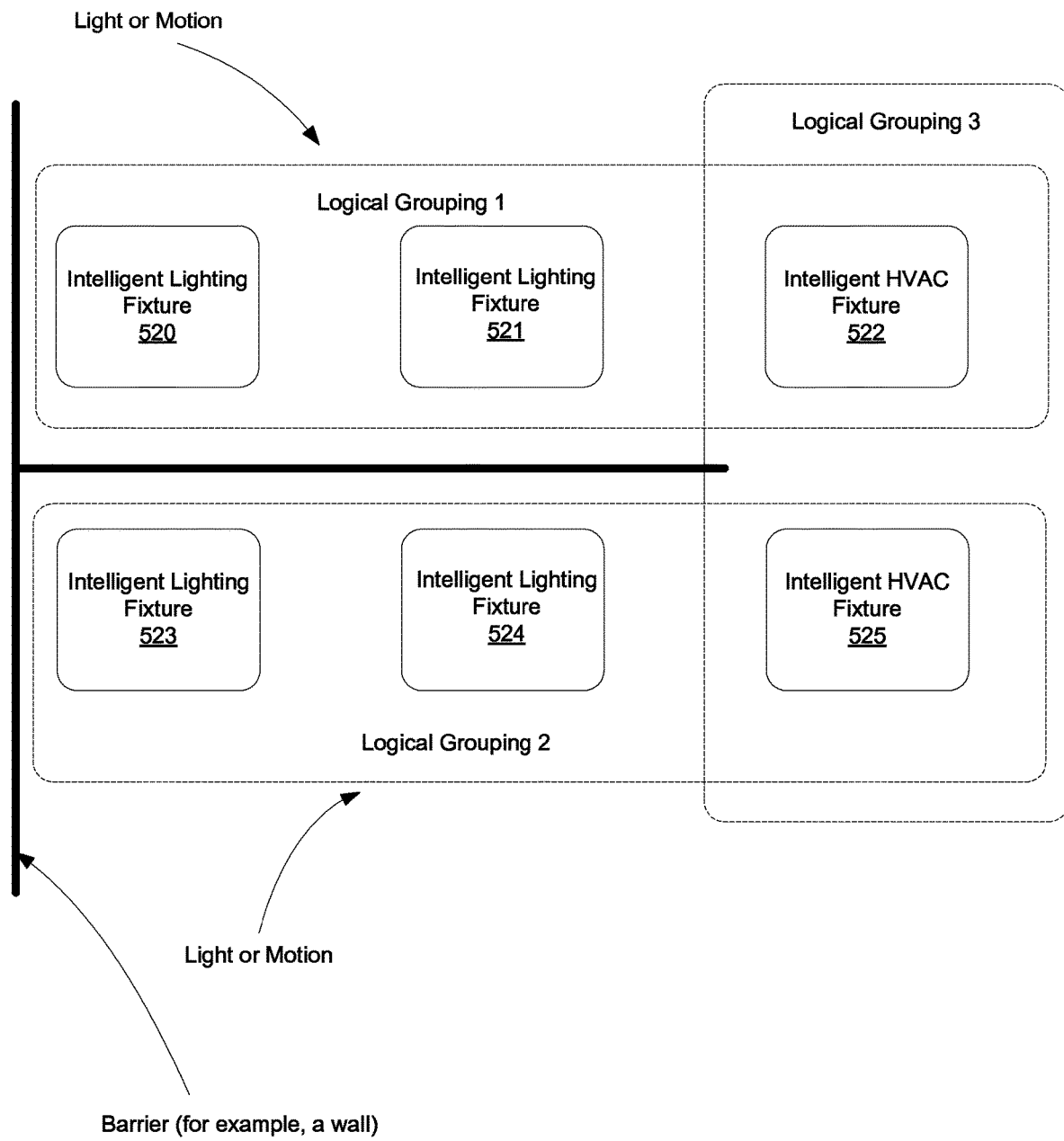
FIG. 5 shows logical groups of loads, according to an embodiment.

FIG. 5 shows logical groups of loads, according to an embodiment. Again, for this particular embodiment the loads include intelligent light fixtures 520, 521, 523, 524. Further, the loads include intelligent HVAC (heating, ventilation, and air conditioning) systems 522, 525. It is to be understood that these are provided as exemplary load. Many other types of loads are possible.

As shown, a first logical group includes intelligent light fixtures 520, 521 and HVAC device 522. A second logical group includes intelligent light fixtures 523, 52.4 and HVAC device 525. A third logical group includes HVAC device 522 and HVAC device 525. For at least some embodiments, a sensed parameter a load of a logical group influences the behavior of another load within the logical group. Based on a received demand response, the power load of one or more of the logical groups may be decreased—attempting to adjust the power load to a target level. Based on sensed parameters, the power loads within each of the logical groups adapt their power load. The parameters may be sensed over time, allowing the loads of the logical groups to adaptively adjust their power loads to be closer or below the target level.

Figure 6:
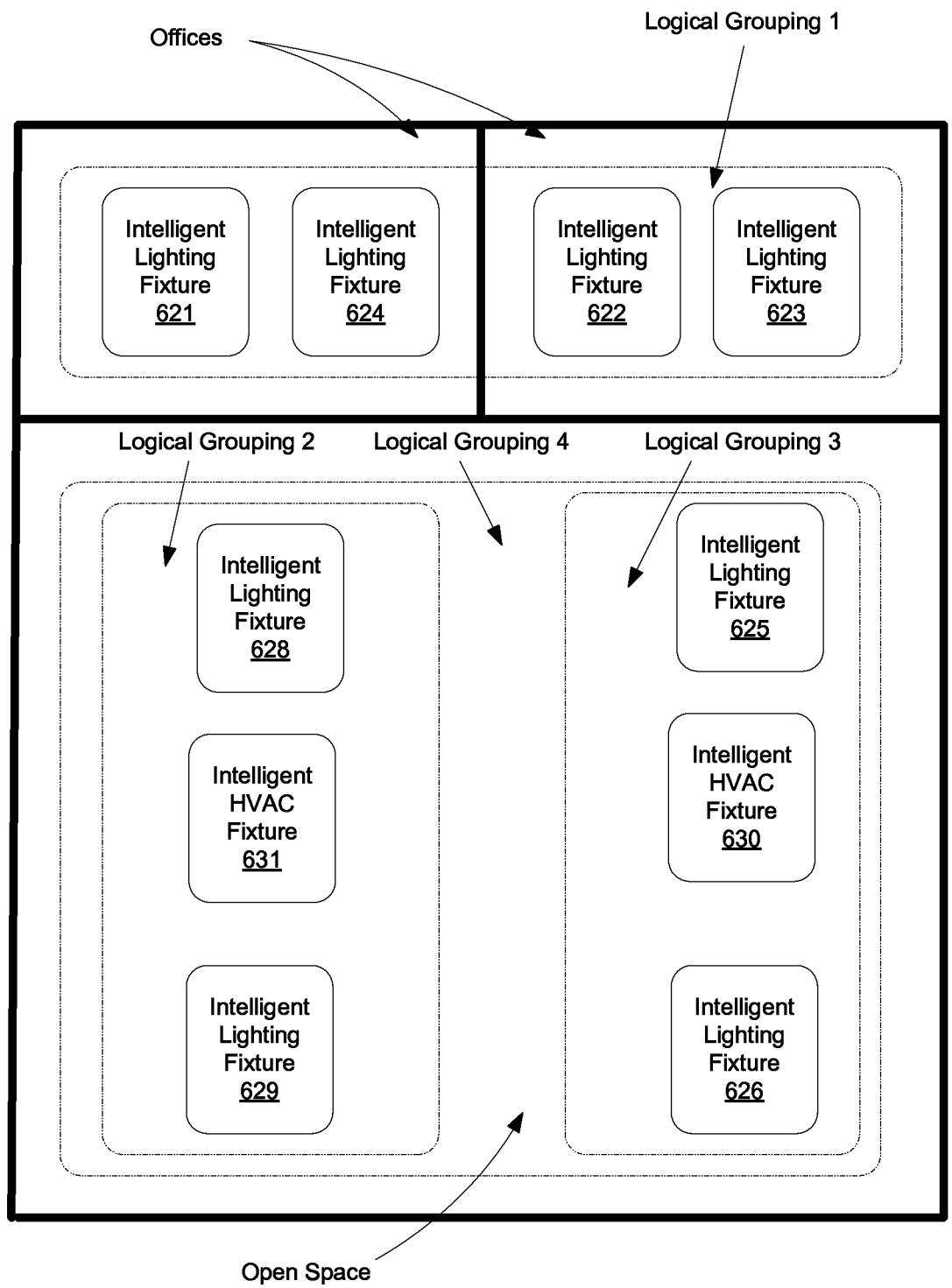
FIG. 6 shows logical groups of loads, according to another embodiment.

FIG. 6 shows logical groups of loads, according to another embodiment. Here, a structure such as a building is shown that includes an office area and an open area. As shown, a first logical grouping (logical grouping 1) includes the intelligent lighting fixtures 621, 622, 623, 624 that are located within the offices. The first logical grouping can control the light, as well as HVAC devices located within the offices. A second logical group (logical grouping 2) includes intelligent lighting fixtures 628, 629 of the open area, and the third logical group (logical grouping 3) includes the intelligent lighting fixtures 625, 626 of the open area. A fourth logical group (logical grouping 4) includes intelligent HVAC fixtures 630, 631 of the open area. Each of the logical groupings can be controlled to reduce a power load of each logical group based upon the sensitivity coefficient and the baseline load of the logical group. Further, at least one load of at least one of the logical group sensing a parameter, wherein a power load of the at least one load is based on the sensitivity coefficient and baseline load of the at least one logical group, and further based on the sensed parameter.

At least some embodiments of the loads include fixtures, such as, lighting fixtures, while for other embodiments the loads include environmental control apparatuses, such as, heating, ventilation and air conditioning (HVAC) devices, and other embodiments include security controls. Embodiments of the building fixtures (loads) provide independent, intelligent building controls. The intelligence of each individual building fixture can be enhanced through communication with other building fixtures (loads) of logical groupings of the building fixtures (loads). The logical groupings can be designated in one or more ways, and each building fixture of a logical group can utilizing sensed information from one or more of the other building fixtures (loads) of the logical group. These embodiments allowing for easy, efficient scaling of building control.

At least some of the described embodiments provide building control systems that operate with distributed intelligence. The described embodiments can be utilized to move intelligence from a central point or controller to the building fixtures (loads) themselves.

Embodiments of the building fixtures (loads) include devices that are attached to the walls or ceilings of a structure and are used to provide environmental services such as heat or light, or security services such as surveillance or fire protection. Embodiments of the building fixtures (loads) can be installed by construction crews in new or remodeled buildings, but can be added as necessary later. The most common fixtures (loads) include light fixtures, heating or cooling vents, fans, security cameras, or fire alarms and sensors.

The advent of low-cost microprocessor controllers has allowed the control point to be replicated into each fixture along with communications between controllers, so that centralized control points are no longer needed. The fixtures are now able to operate separately, or in logical groups to control the environment. User control points can be provided as required to allow a user to control one or more logical groupings of fixtures. User control points simply communicate with the network of fixtures to provide the necessary control information. Also system administrators can manage the building functions by setting up or changing logical groupings of fixtures as required to enable proper system operation. Finally, the networks of the describe embodiments provide built-in redundancy, as failed sensors or fixtures can be neutralized and alarmed to keep the fixture network functioning properly.

Figure 7:
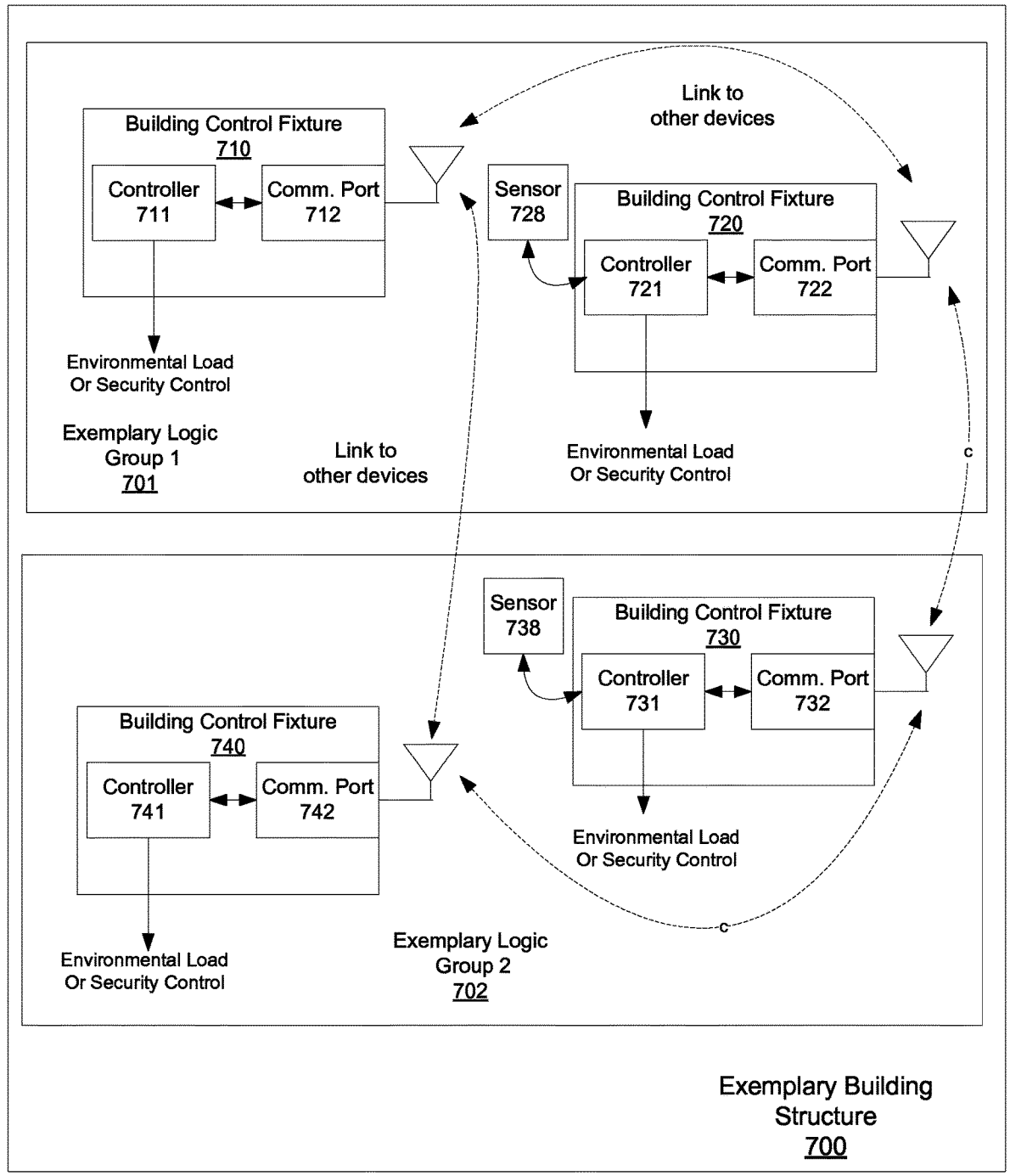
FIG. 7 shows an example of a building control system according to another embodiment.

FIG. 7 shows an example of a building control system according to an embodiment. As shown, the building control system includes a plurality of building fixtures (loads)

(loads) 710, 720, 730, 740 located within, for example, a building structure 700. It is to be understood that the term "building" may be used here to designate of define any structure that may include and benefit from the use of the described building fixtures (loads) (loads), such as, any type of indoor room or structure, including, for example, a parking structure.

The building control system includes at least one sensor (such as, sensors 728, 738) interfaced with at least one of the plurality of building fixtures (loads) (loads) (such as, building fixtures (loads) (loads) 720, 730). As shown, the building fixtures (loads) (loads) 710, 720, 730, 740 each include a communication port (such as communication ports 712, 722, 732, 742) and a controller (such as, controllers 711, 721, 731, 741).

As will be described, each controller is configured to independently control at least one of an environmental load or a security device. Each controller is configured to either receive or help designate the building fixture as belonging to a logical group of building fixtures (loads) (loads). Additionally, each controller is configured to share at least one of sensor or state information with other building fixtures (loads) (loads) within the logical group of building fixtures (loads) (loads), through the communication port.

FIG. 7 shows exemplary logical groups 701, 702. While the logical groupings of FIG. 7 do not overlap (that is, there is not a building fixture shown as belonging to multiple logical groups), embodiments includes building fixtures (loads) (loads) belonging to one or more logical groups. As will be described, the logical groups can be dynamic and change over time.

At least some embodiments of the building fixtures (loads) (loads) (also referred to as building control apparatuses) include a device mounted to a wall or a ceiling of a building. Embodiments of the building fixtures (loads) (loads) supply a variety of services including light, heat, and cold air as needed. Additionally, or alternatively, multiple of the building fixtures (loads) (loads) of a logical grouping of building fixtures (loads) (loads) contain sensors or cameras that are used to provide security and fire control systems throughout, for example, buildings.

One embodiment of a building fixture includes an intelligent light fixture. Light fixtures come in many forms with the fluorescent fixture being the most common in buildings. New fluorescent fixtures can be fitted with special ballasts that allow for dimming.

Another embodiment of a building fixture system includes arrays of ceiling fans such as are often found in buildings where the climate is warm or humid. The speed of the fans where people are present can be made faster. HVAC (heating, ventilation, and air conditioning) systems often have multiple ports in a large room. By controlling the flow or temperature of air in active areas cooling and heating costs can be reduced.

Another embodiment of a building fixture system includes an audio speaker array. By varying sound levels to match activity, audio systems can be made more effective.

Another embodiment of a building fixture system includes surveillance systems. An array of surveillance components such as microphones or cameras lend themselves to intelligent control. Activity can be monitored by the system so the fixtures can focus on areas where people happen to be located.

Another embodiment of a building fixture system includes RFID (radio frequency identification) tag reader arrays. Embodiments of RFID tag systems include badge readers lend themselves to intelligent arrays. It is possible to track and display movements of workers in a building by individual. A system of this nature can make access available to certain people while blocking others. By combining the other surveillance components above with RFID tags, any activity of any individual can be monitored in detail.

Another embodiment of a building fixture system includes a fire alarm system. That is, embodiments of the building fixture system can be used for fire alarm systems. The fixtures can sense and monitor possible fire indicators: carbon monoxide, temperature, smoke, sprinkler status, etc. The system can also check for people in a fire area, fire doors, etc. Activation of a fire alarm box can place the array into a fire mode to track or confirm the alarm in order to lock down elevators, close fire doors, and notify security. Today's fire alarm systems can be expensive to install and maintain. Using an array of intelligent building fixtures (loads) (loads) can greatly reduce installation and maintenance costs as it can be piggybacked onto an existing array.

Embodiment includes various methods of deploying the described intelligent building fixtures (loads) (loads). Generally, four modes of deployment have been identified.

A first mode includes an installation mode. Fixtures are normally be installed by electricians. As each fixture is installed, it may be tested by powering it up. In the installation mode, each fixture responds independently with the fixture turning on or providing an audible or visual indicator when powered up.

A second mode includes a setup mode. Once the installation is finished the array of fixtures enters the setup mode. Two types of setup are possible. A first setup type is automatic. In this mode, the fixtures would learn to communicate with each other. The first step would be for each fixture to identify itself to the other fixtures in the array. The fixtures would be interconnected via a data network. Each fixture would perform a function visible to the adjacent fixtures. In this manner, it is possible to associate the address of a fixture with its physical location. Obstructions such walls would form the boundaries of each array. A typical array would include a single line 1×N (hall), or an M×N array (room). Other geometric shapes are a circle, a ring, a trapezoid, or a triangle. Stairs between floors would be also identified. Once an array of fixtures is recognized, it can later be tagged and associated with a control device, such as a switch, by a system administrator. A second setup type is manual. Manual identification of an array of fixtures would be performed by a system administrator. First, the administrator would identify a fixture using a laser pointer. The administrator would then add each fixture to an array. When the process is performed manually, the administrator would have complete control of the setup process. The administrator would identify the array and assign a switch to control it. When the administrator has finished the setup of the fixtures, he would allow the system to progress to the operational mode.

A third mode includes an operational mode. Fixtures perform as a unit in the operational mode. The arrays previously set up respond to activity or controls such as switches. In the operational mode, the fixtures execute software that has been previously selected by the administrator or downloaded from an external source. This software allows the fixtures to track movement by a person walking along a hall or through a room. Based on the movement, the fixtures tracks or illuminate the party as the party moves through the space. The operational mode also provides for simple additions or replacement of fixtures. Major changes can require the system to enter a teardown mode.

A fourth mode includes a teardown mode. The teardown mode is used when major troubleshooting, repair or changes of the array are needed. The teardown mode restores the system to the installation mode. In that mode, the array can be modified and made ready for setup.

Embodiments of the building control systems include building fixtures (loads) (loads) that are networked. In order for the fixtures to communicate they would be part of a data network. The network can be a typical wired or wireless LAN. The network can also be a specialized network such as a wireless Ad-Hoc network, or a Bluetooth network. Another type of network is a data network that communicates over the power lines. This type of network saves having to run special data wiring to each fixture. Each fixture would be assigned a MAC layer address when manufactured which would be used during setup and operation to identify the fixture.

Referring back to FIG. 7, at least one of the building control fixtures (720, 730) is interfaced with a sensor 728, 738. However, another embodiment includes the sensor being physically incorporated into at least one of the building fixtures (loads) (loads). Various configurations of the sensor include a light sensor, a motion sensor, or an environment sensor (such as a temperature sensor or humidity sensor). It is to be understood that each sensor can include one of such listed sensors, or any combination of the listed sensors. Other possible types of sensors include, for example, a sound/noise sensor, an intrusion detection sensor, a seismic motion (or structural motion detection) and/or a voltage/current/power meter For at least some embodiments of the building control system of FIG. 7, the building control fixtures 710, 720, 730, 740 are independently operable. That is, each of the fixtures can operate completely independently, and the controller within each fixture is operable without receiving any commands from a central controller. For other embodiments, the fixtures operate in conjunction with other fixtures, such as, other fixtures within a common logical group. For this embodiment, decisions regarding building control can involve a collaborative interaction between multiple fixtures. For other embodiments, one or more fixtures are interfaced with a system controller.

For an embodiment, each controller 711, 721, 731, 741 independently control an environmental load or a security device. More specifically, the controller controls at least one of a lighting intensity, an environmental control, or a building security control. As will be described, the building control fixtures can include lighting (that is, a light in included with the fixture), and the controller of the fixture controls the intensity of light emitted from the light. Alternatively or additionally, the fixture can include environment control, such as, temperature or humidity. For this embodiment, the fixture can be interface or be a part of an HVAC system. Alternatively or additionally, the fixture can interface with or be a part of a building security system.

For at least some embodiments, the controller of each fixture is operative to independently control the environmental load and/or the security device based on at least one of shared sensor or shared state information received from at least one other of the plurality of building fixtures (loads) (loads) within the logical group. For embodiments, the environmental control includes light, temperature and/or humidity. For embodiments, the shared sensor information includes sense light, motion, temperature, humidity, and other possible sensors. For embodiments, the state information includes, for example, occupancy information, clear state timer, light fixture emitted light intensity.

A fixture may control, for example, an intensity of light emitted from the fixture based at least in part on a sensed parameter from another fixture of the logical group. A fixture may control heat or humidity based on temperature or humidity sensing of other fixtures within the logical group. A fixture may make security decisions based on parameters sensed by other fixtures of the logical group.

A factor that greatly adds to the intelligence of the distributed building control fixtures are the designations of logical groups, wherein building fixtures (loads) (loads) of a logical group control building parameters based on sensed input from other building control fixtures of the logical group.

For an embodiment, the controller within a building control fixture is operative to help designate one or more of the plurality of building fixtures (loads) (loads) as belonging to the logical group. That is, the fixtures operate in conjunction with other fixtures, such as, other fixtures within a common logical group. For this embodiment, decisions regarding building control can involve a collaborative interaction between multiple fixtures.

For another embodiment, at least a sub-plurality of the plurality of building fixtures (loads) (loads) auto-determine which building fixtures (loads) (loads) are included within the logical group.

For an embodiment, fixtures auto-designate logical groups based on location and/or proximity. That is, for one example, each fixture knows their location (for example, x, y and z coordinates) and auto-designates based on a sensed input, and proximity, or a location (for example, x, y and z coordinates) of the sensor that generated the sensed input. Fixtures which are classified into certain categories (e.g. corridor, emergency) affiliate themselves with other fixtures based on commonality of category and proximity. For example, a fixture in a corridor or emergency path will receive motion sensing input from another fixture in the corridor or emergency path and, based on the fact that they are both in the same category and that they are within a distance threshold (proximity) determines that it is in the same motion group as the fixture from which input (sensed) was received.

State another way, for an embodiment, auto-determining includes at least one of the building fixtures (loads) (loads) receiving a sensed input of a different building fixture, and the at least one building fixture auto-designating itself into a logical group that includes the different building fixture based on a proximity of the at least one building fixture to the different building fixture. For a specific embodiment, the at least one building fixture determines its proximity to the different building fixture based on a three-dimensional x, y, z location of the at least one building fixture relative to a three-dimensional x, y, z location of the different building fixture.

While described in the context of auto-designating groups, it is to be understood that location or proximity information can be used by fixtures to influence operation. That is, for example, a fixture may base its operation based on logical groupings, and additionally, based on the proximity of a sensed input.

For an embodiment, an administrator specifies which of the plurality of building fixtures (loads) (loads) belong to the logical group. Generally, the administrator specification occurs at installation, and may remain static. For another embodiment, a manual operator specifies which of the plurality of building fixtures (loads) (loads) belong to the logical group. This can include the operator having a manual control (such as a switch or a set of switches) that allows the manual operator to set and control logical groupings.

An embodiment includes each of the building fixtures (loads) (loads) of the logical group additionally being operative to receive an input from a device, wherein the building fixture responds to the input if the input includes an identifier associating the input with the logical group. For this embodiment an external controller can interface with particular logical groups based on the unique identifier associated with the logical group. Associating the unique identifiers with logical groups provides for ease of scaling of the number of building fixtures (loads) (loads). That is, for example, conventional centrally-controlled systems require either more messages or larger messages to control building fixtures (loads) (loads), whereas including unique identifiers with logical groups provides for an efficient system in which the transmitted data doesn't grow or increase as the group grows. Additionally, the system is less reliant on and requires less use of any one communication channel, and therefore, the likelihood of failure due to communication channel use is less.

An embodiment includes building fixtures (loads) (loads) within the logical group restarting a clear-state-timer upon sensing of motion and/or light by a building fixture within the logical group. The clear-state time can be defined by an occupancy window that estimates, for example, how long a space will be occupied after sensing an occupant. That is, for example, lights can be turned on within a building or structure for a period of the clear-state-timer, which can be estimated by an occupancy window. This embodiment allows members (building fixtures (loads) (loads)) of a logical group to transition states while maintaining synchronization with each other.

An exemplary method or sequence of events of a clear-state-timer operation includes fixture in motion group detecting motion. For operation of an exemplary set of lighting fixtures, all fixtures in motion group brighten and set an occupancy window of some configured time. At the expiration of the occupancy window, the fixtures should dim/turn off. However, if during the occupancy window, some fixtures in the motion group subsequently detects motion, all fixtures in the motion group reset the occupancy window since the area covered by the motion group is still occupied. After the occupancy window expires, all fixtures dim or turn off.

For an embodiment, sensing of motion and/or light by building fixtures (loads) (loads) within the logical group within a predetermined amount of time after restarting a lighting on-time are ignored. That is, for example, sensing of light and/or motion is ignored just after lighting of the lighting fixtures. The period of time in which sensed inputs are ignored can be defined a dead-time. The dead time can reduce "chatter" between lights of a logical group. That is, multiple lights within a logical group can near-simultaneously sense a change in motion and/or light which can cause redundant or excess chatter among the lighting fixtures of the logical group.

An embodiment includes a building fixture ignores its own sensing of light and/or motion for a predetermined period of time if the building fixture receives an indication of sensing of light and/or motion from another fixture of the logical group. This process can be defined as "anti-sensing". Anti-sensing can be useful, for example, for preventing a light fixture of an office or a conference room from turning on when someone passes by outside the office or conference room.

Figure 8:
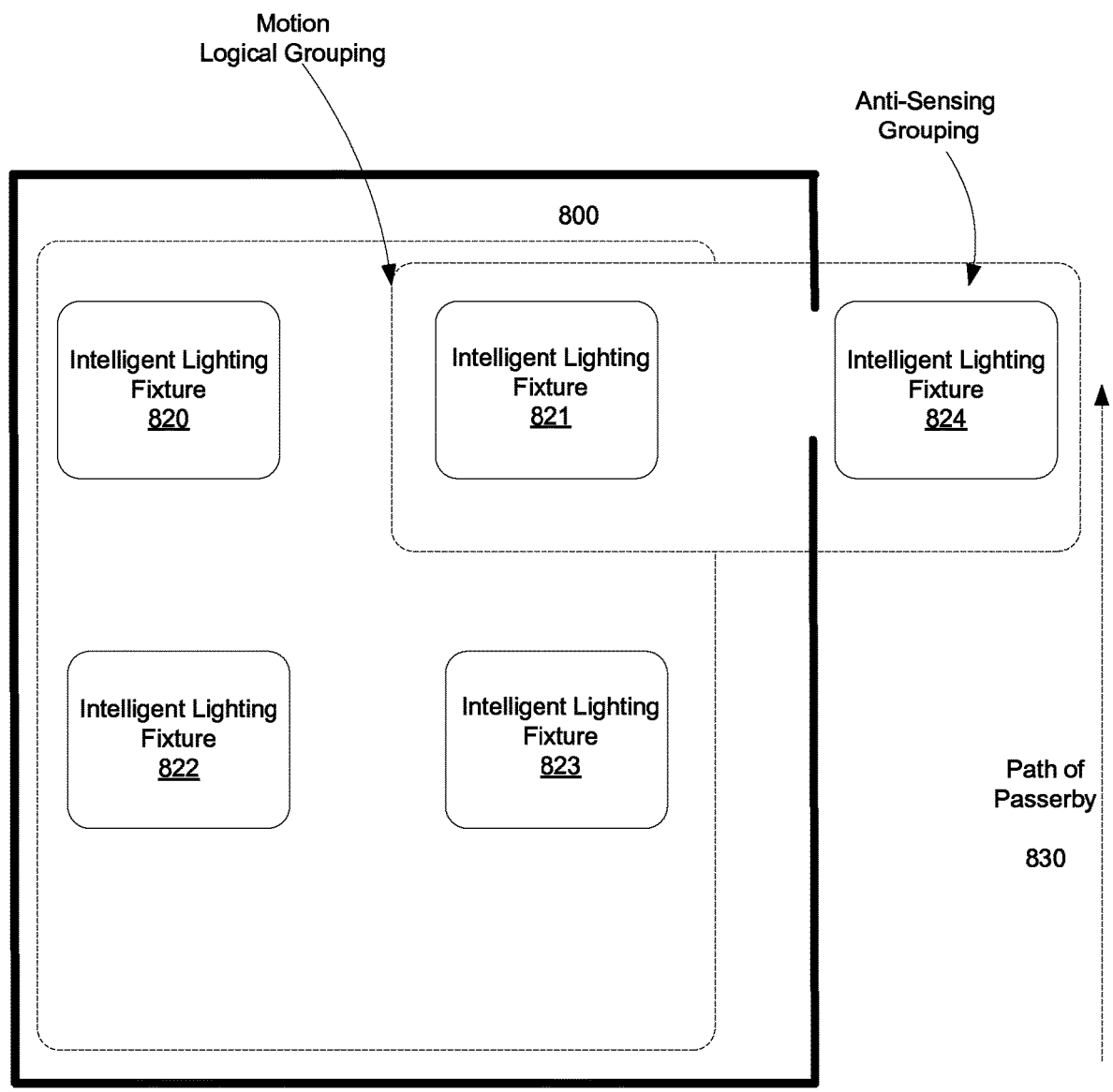
FIG. 8 shows an example of an anti-sensing group of fixtures.

FIG. 8 shows an example of an anti-sensing group of fixtures. An motion sensing group includes fixtures 820, 821, 822, 823. Also as shown, an anti-sensing group is formed that includes the fixture 821 which is location within, for example, a conference room 800, and a second fixture 824 is located outside of the conference room. For this embodiment, if both fixtures 821, 824 in the anti-sensing group detect motion, the fixture 821 in the conference room will ignore its own sensing of motion (anti-sensing) as will the other fixtures 820, 822, 823 within the motion sensing group because the detection of motion by the fixture 824 outside the room indicates that a passerby 830 triggered this motion event.

Various embodiments include different types of logical groups. Exemplary logical group types include, for example, a motion sensing group (previously mentioned), an ambient light group, a logical temperature group, and a logical switch group. Clearly, additional types of logical groups can additionally or alternatively exist. Additionally, a building fixture can belong to any number of different logical groups. Logically grouping of building fixtures (loads) (loads) is useful for synchronizing members of logical groups, normalizing behavior based on larger samples of data, and/or making better decision based on larger sample of data. Additionally, a fixture being able to belong to any number of different groups is difficult and expensive in centrally controlled systems. As the membership list of fixtures in a centrally controlled system grows, the data that the controller must manage grows, which causes scaling problems.

An exemplary motion sensing group can be utilized, for example, by lighting fixtures located in a corridor. For an embodiment, building fixtures (loads) (loads) of a corridor determining they are in a corridor, and auto-designate themselves to be included within a common logical group (that is, the motion sensing group). Further, the motion sensing group includes a corridor look-ahead behavior, wherein for the look-ahead behavior, a plurality of overlapping logical groups of building fixtures (loads) (loads) provide propagation of light along a corridor.

This propagation of light can be used in applications where objects are moving at a high speed and the path of the object's motion needs to be illuminated. Additionally, the corridor look-ahead behavior provides for a safer environment in sparsely populated hallways during the night since individuals moving through the corridor can see farther ahead. By using the corridor look-ahead behavior, the motion sensing group can achieve an effective mix of safety and energy efficiency because the appropriate level of light is provided without having to illuminate the entire corridor (as is the case with many traditional lighting control systems).

For the ambient light group, an embodiment includes at least a subset of the plurality building fixtures (loads) (loads) auto-designating themselves to be within the ambient light group. The auto or self-designation of the light can be made, for example, by the at least a subset of the plurality of light determining that they receive a change of light near-simultaneously (that is, for example, within a defined time slot).

For an embodiment, if at least one of the building fixtures (loads) (loads) of the logical group sense a motion and/or light sensing blindness condition, then the at least one building fixture retrieving sensing information from other building fixtures (loads) (loads) within a common logical group to determine motion and/or ambient light level, and the building fixture responds accordingly. That is, a building fixture (such as a lighting fixture) solicits information from others in logical group if the lighting fixture is blind. It is to be understood that the same concept can be extended to other sensor as well, such as, motion sensors or temperature sensors.

For a logical switching group, an embodiment includes the logical group being designated by a group id, and building fixtures (loads) that are members of the logical group having the group id are controlled by a logical switch or a physical switch. For an embodiment, the member building fixtures (loads) are controlled to provide predetermined scenes.

For example, a conference room might have predetermined scenes which dim the fixtures near a projector screen or group viewing monitor. Other scenes can include optimizing light levels for specific tasks (for example, task tuning)

An embodiment includes at least one building fixture of the logical group receiving a reference or baseline value for at least one of motion and/or light sensor input from another building fixture in the logical group. For example, a lighting fixture solicits the ambient light level from another lighting fixture in the logical group to establish a reference for the minimum light level in a particular building location. Further, the lighting fixture may receive the input from the other fixture(s) in the group, and then compare its own measured (sensed) values against the received values to make a decision. For example, the received values could be a target (such as a heating or cooling target, and further the fixture adjusting its temperature until it reaches the target). For another embodiment, the building fixture uses the received value to determine some external factor. For example, the value received from a fixture located outside can be used to determine outside temperature which can be used to aid in adjustment of an inside temperature. Clearly, these embodiments can be extended beyond just temperature control.

For the logical temperature group, an embodiment includes a building fixture receiving at least one of an occupancy (motion) input and a temperature sensor input from at least one of the other fixtures in the logical group to control an environmental load. For other embodiments, this can further include the building fixture controlling the environmental load by averaging the temperatures of all the building fixtures (loads) in the logical group. Additionally or alternatively, embodiments include the building fixture controlling the environmental load, for example, using only the temperatures of building fixtures (loads) in the logical group which are reporting occupancy. For embodiments, the environment is controlled only in places that matter, such as, occupied spaces. The described embodiments allow from determination of whether a space is really occupied, are whether one is merely passing through the spaces.

FIG. 9 is a flow chart that includes steps of an example of a method of operating a building control fixture according to an embodiment. A first step 910 includes designating the building fixture as belonging to a logical group of building fixtures (loads), wherein the designating comprises at least one of receiving the designation or the building fixture aiding in the designation. A second step 920 includes independently controlling, by the building control fixture, at least one of an environmental load or a security device. A third step 930 includes sharing, by the building control fixture, at least one of sensor or state information with other building fixtures (loads) within the logical group of building fixtures (loads), through a communication port of the building control fixture.

As previously described, and embodiment further comprising the building control fixture receiving a sensor input, wherein the sensor input includes at least one of light, motion, or an environmental condition.

Figure 10:
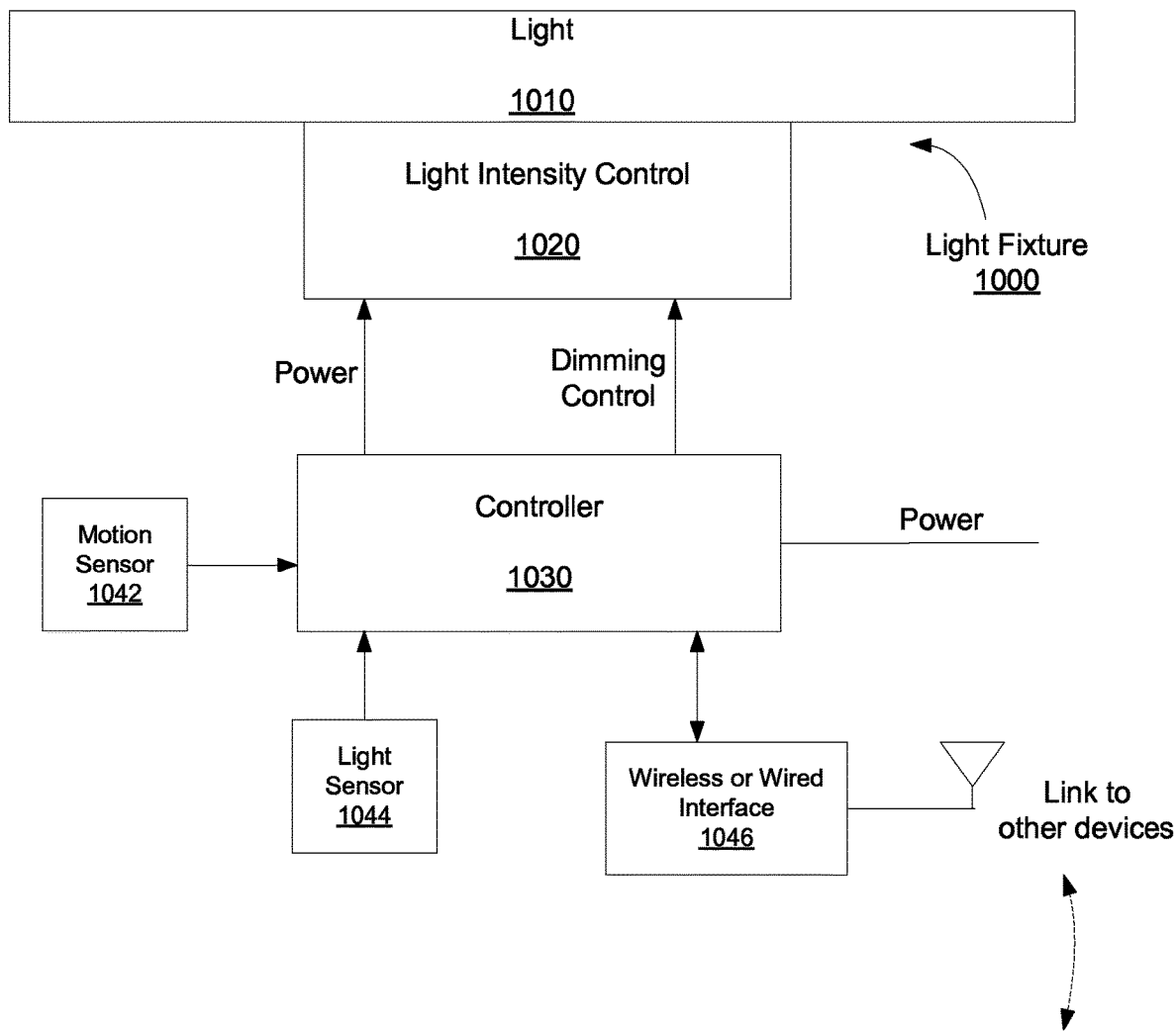
FIG. 10 shows a building fixture that provides lighting control according to an embodiment.

FIG. 10 shows an example of an intelligent lighting fixture 1000. A controller 1030 provides dimming and/or power control to a light 1010 through a light intensity control (such as, a dimming ballast) 1020. For an embodiment, the light intensity control 1020 receives a power input and a dimming control input, and provides a regulated current to the light 1010.

The intelligent light controller 1030 communicates with other devices through a wireless or wired interface 1046. The other devices include, for example, an authorized (manager) device, one or more other intelligent lighting fixtures.

As a part of, for example, an energy-savings mode of the intelligent light controller 1030, the intelligent light controller 1030 receives inputs from sensors, such as, a motion sensor 1042 and/or a light sensor 1044. Clearly, other sensors can be utilized as well.

For at least some embodiments, the light 1010 is a gas-discharge lamp, which is typically a negative-resistance device. Such devices cannot effectively regulate their current use. If such a device were connected to a constant-voltage power supply, it would draw an increasing amount of current until it was destroyed or caused the power supply to fail. To prevent this situation, a ballast (such as the dimming ballast 1020) provides a positive resistance that limits the ultimate current to an appropriate level. In this way, the ballast provides for the proper operation of the negative-resistance device by appearing to be a legitimate, stable resistance in the circuit.

Figure 11:
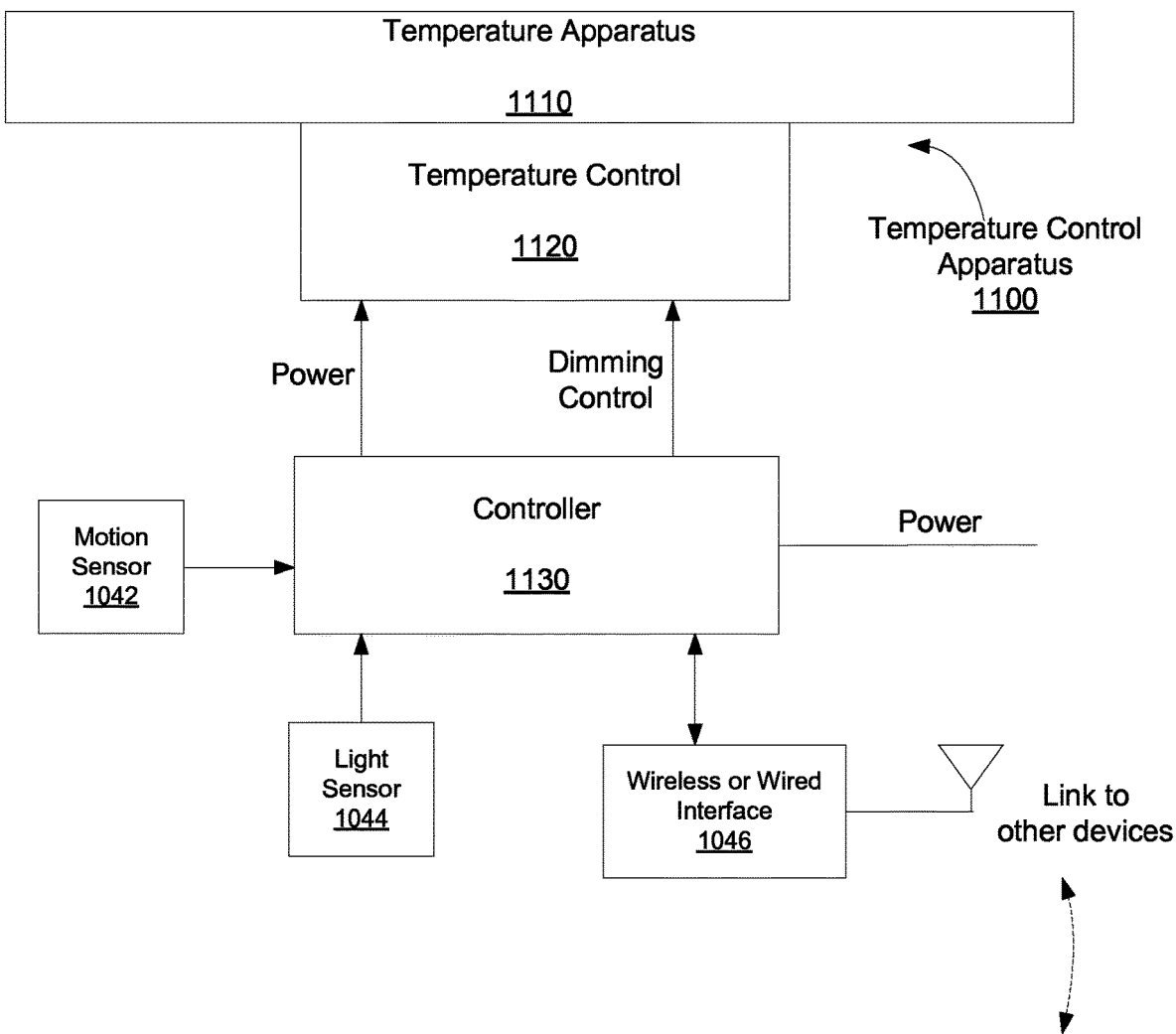
FIG. 11 shows a building fixture that provides environmental control according to an embodiment.

FIG. 11 shows an example of an intelligent temperature control apparatus 1100. The temperature control apparatus can be, for example, at least a part of a HVAC system. A controller 1130 provides temperature control to a temperature apparatus 1110 through, for example, a temperature controller 1120. This embodiment includes similar sensors 1042, 1044 and communication interface 1046.

FIG. 11 exemplifies that the logical grouping control for lighting of the described embodiments can be extended to, for example, temperature control. That is, sensing conditions, such as, temperature, motion and/or light of one temperature control apparatus can be used to aid in the control of another temperature control apparatus.

Figure 12:
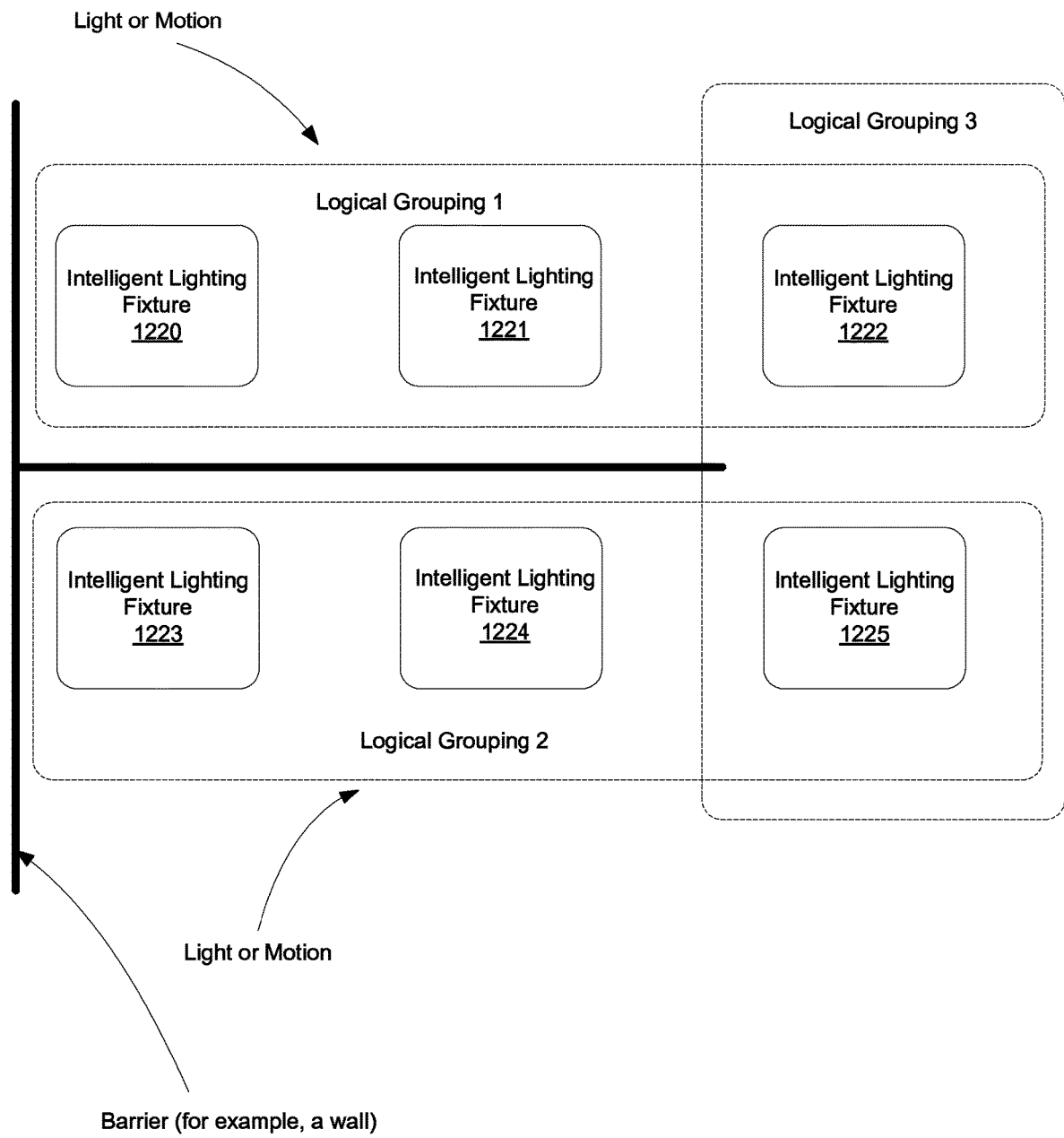
FIG. 12 shows an example of a lighting system that includes logical groupings of intelligent lighting fixtures.

FIG. 12 shows an example of a lighting system that includes logical groupings of intelligent lighting fixtures. For example, a first logical group (grouping 1) includes intelligent lighting fixtures 1220, 1221, 1222, and a second logical group (grouping 2) includes intelligent lighting fixtures 1223, 1224, 1225, and a third logical group (grouping 3) includes intelligent lighting fixtures 1222, 1225.

Different embodiments include the logical groupings being made in different ways. For example, the logical groupings can be made by commonality of motion and/or light sensing of the groups. The logical groupings can be predefined by a lighting system manager.

As shown in FIG. 12, an exemplary barrier, such as, a wall defines the logical groupings. For example, due to the presence of the wall, a natural logical group 1 and logical group 2 can result. That is, light or motion sensed by the members of the logical group 1 may not be sensed or be relevant to the members of the logical group 2. Additionally, a third logical group 3 may have commonality in sensing within themselves, but be different than those of logical groups 1 and 2.

For at least some embodiments, each of the intelligent light fixtures operate independently, but can receive additional information from sensors of other intelligent light fixtures within a common logical group. As shown in FIG. 12, intelligent lighting fixtures can belong to multiple logical groups. The logical groupings can be dynamic and defined in multiple ways.

A system operator can predefine logical groups, and the system operator can later change the logical groupings. Additionally, as previously described the intelligent lighting fixtures can define logical groupings themselves.

Figure 13:
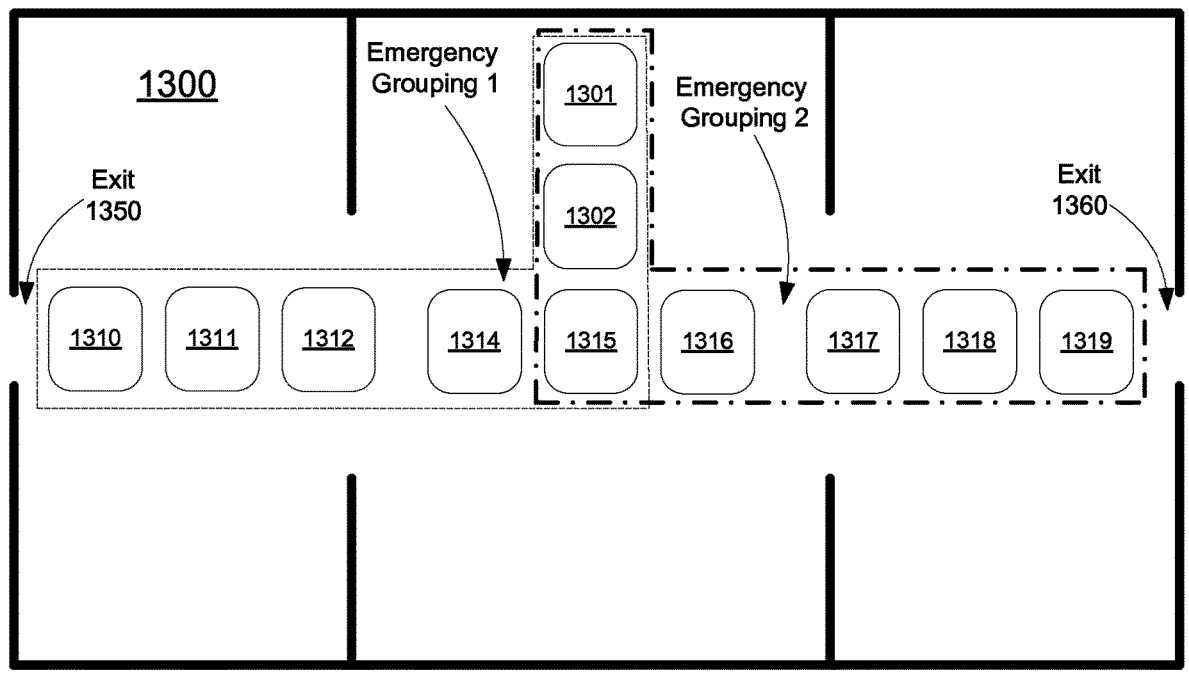
FIG. 13 shows an example of emergency path groups of fixtures.

FIG. 13 shows an example of emergency path groups of fixtures. The emergency path logical groups can be designated by any of the described methods. Once designated, the logical groupings can work individually or in combination to provide at least one indicator of a safe path for occupants of a building structure 1300. A first emergency logical group includes building fixtures (loads) 1310, 1311, 1312, 1314, 1315, 1302, 1301, while a second emergency logical grouping includes fixtures 1301, 1302, 1315, 1316, 1317, 1318, 1319. If an emergency indicator is received by one or more of the building fixtures (loads), the building fixtures (loads) or corresponding emergency logical groups can respond. For example, lights of the emergency logical groups can flash or provide some sort of an alert to occupants of the building structure 1300 that an emergency condition exists. The emergency condition can come from anywhere (such as an internal or external sensor), and indicate any type of emergency (such as, fire, flood, smoke, earthquake, ect.). Once the emergency indicator has been received, emergency logical groups can additionally used sensors of other fixtures to deduces and determine, for example, safe exist paths for occupants. For example, if the building fixture 1319 senses heat or smoke in the vicinity of the building fixture 1319, either one or both of the emergency logical groups (1 or 2) can provide one or more indicators (such as arrows are other indicators of direction) that provide a safe path for occupants to, for example, exit 1350, or away from exit 1360. For example, the indicators can provide a safe path away from the building fixture 1319 (near exit 1360) in which smoke or heat has been sensed.

State in another way, for an embodiment, the logical groups comprise emergency path groups, and the emergency path groups respond to reception of an emergency indicator, and further respond to sensed conditions of one or more sensors of other fixtures. Further, for an embodiment, the emergency path group provides a safe path indicator for directing occupants to a safe path when the emergency indicator is received.

Figure 14:
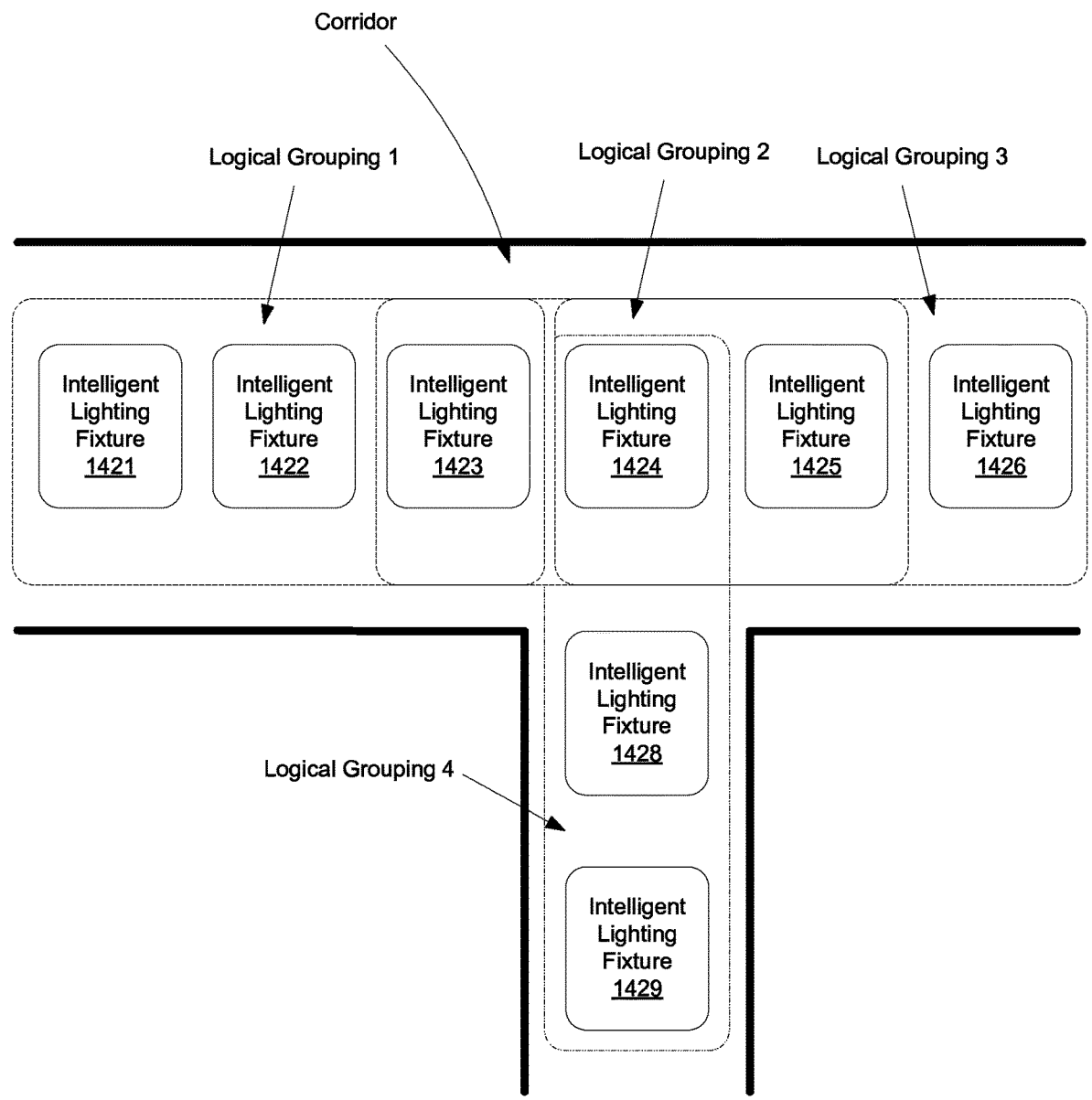
FIG. 14 shows an example of logical groupings of intelligent lighting fixtures within a corridor.

FIG. 14 shows an example of logical groupings of intelligent lighting fixtures within a corridor. As shown, a first logical grouping of intelligent lighting controllers can include intelligent lighting fixtures 1421, 1422, 1423, a second grouping of intelligent lighting controllers can include intelligent lighting fixtures 1423, 1424, 1425, a third grouping of intelligent lighting controllers can include intelligent lighting fixtures 1424, 1425, 1426, and a fourth group of intelligent lighting controllers can include intelligent lighting fixtures 1424, 1428, 1429.

As a user travels down the corridor, the intelligent lighting fixtures can each forecast the arrival of the user by utilizing information from other intelligent lighting fixtures within the same logical grouping. For example, intelligent lighting fixture 1423 can be alerted that a user is nearby and likely to be traveling near the intelligent lighting fixture 1423 through motion sensors of the intelligent lighting fixture 1421, which is in the same logical group as the lighting fixture 1423. Similarly, intelligent lighting fixture 1424 can be alerted that a user is nearby and likely to be traveling near the intelligent lighting fixture 1424 through motion sensors of the intelligent lighting fixture 1429, which is in the same logical group as the lighting fixture 1424. The control of each individual intelligent lighting fixture is made more intelligent by providing the intelligent lighting fixture with information of sensors of other intelligent lighting controllers of common logical groups.

FIG. 15 is a flow chart that includes the steps of a method of distributed lighting control according to an embodiment. A first step 1510 includes each of a plurality of independently controlled lighting fixtures sensing light and/or motion, and independently controlling an intensity of light of the lighting fixture. A second step 1520 includes specifying one or more of the plurality of independently controlled lighting fixtures as belonging to a logical group. A third step 1530 includes each of the lighting fixtures of the logical group additionally controlling the intensity of light of a lighting fixture based on sensing of light and/or motion of another lighting fixture of the logical group.

For at least some embodiments, at least one of the plurality of independently controlled lighting fixtures belongs to a plurality of logical groups. Further, at least some embodiments include a central system administrator that specifies which lighting fixtures belong to the logical group, while other embodiments include a manual operator that specifies which lighting fixtures belong to the logical group.

For at least some embodiments, at least a sub-plurality of the plurality of independently controlled lighting fixtures auto-determines the logical group. For example, a single switch can cause the sub-plurality of lighting fixtures to reboot. The sub-plurality of lights can detect the near-simultaneous rebooting of the sub-plurality of lights and, therefore, self or auto designate themselves as belonging to the logical group.

For at least some embodiments, lighting fixtures within the logical group restart an on time for the lighting upon sensing of motion and/or light by a lighting fixture within the logical group. Further, sensing of motion and/or light by lighting fixtures within the logical group within a predetermined amount of time after restarting a lighting on-time are ignored. That is, just after lighting of the lighting fixtures, following sensing of light and/or motion is ignored, defining a dead-time. This can reduces "chatter" between lights of a logical group. That is, multiple lights within a logical group can near-simultaneously sense a change in motion and/or light which can cause redundant or excess chatter among the lighting fixtures of the logical group.

At least some embodiments includes anti-motion, wherein if a lighting fixture receives an indication of sensing of light and/or motion from another lighting fixture, the lighting fixture ignores its own sensing of light and/or motion for a predetermined period of time.

At least some embodiments include deferral, wherein if at least one lighting fixture of a logical group senses light sensing blindness, an excessive false motion condition, or some other suspect sensor input, the lighting fixtures sensing suspect sensor input retrieve sensor input from other lighting fixtures within the logical group and ignore their own input. That is, the lighting fixtures solicit information from others in the logical group if the lighting fixtures' sensors are providing bad input.

For at least some embodiments, the logical group comprises a motion sensing group. For a specific embodiment, lighting fixtures of a corridor determine they are in a corridor, and auto-designate themselves to be included within a logical group. For a specific embodiment, the motion sensing group includes a corridor look-ahead behavior, comprising a plurality of overlapping logical groups of lighting fixtures that provide propagation of light along a corridor.

For at least some embodiments, the logical group includes an ambient light group. For a specific embodiment, at least a subset of the plurality of lights auto-designate themselves to be within a logical group. The auto or self-designation of the light can be made, for example, by the subset of the plurality of lights determining that they receive a change of light near-simultaneously (within a defined time slot). For an embodiment, if at least one of the lighting fixtures of the logical group sense a light sensing blindness condition, the at least one lighting fixture retrieves sensing information from other lighting fixtures within a common logical group to determine an ambient light level, and the lighting fixture responds accordingly. That is, the lighting fixture solicits information from others in logical group if the lighting fixture is blind.

For at least some embodiments, the logical group includes a logical switch group. For a specific embodiment, the logical group is designated by a group id, and lighting fixtures that are members of the logical group having the group id are controlled by at least one of a logical switch and a physical switch, wherein the member light fixtures are controlled to provide predetermined scenes.

FIG. 16 is a flow chart that includes the steps of a method of distributed temperature control according to an embodiment. A first step 1610 includes each of a plurality of independently controlled temperature apparatuses sensing temperature, light, and/or motion, and independently controlling a temperature. A second step 1620 includes specifying one or more of the plurality of independently controlled temperature apparatuses as belonging to a logical group. A third step 1630 includes each of the temperature apparatuses of the logical group additionally controlling temperature based on sensing of temperature, light and/or motion of another temperature apparatus of the logical group.

Although specific embodiments have been described and illustrated, the described embodiments are not to be limited to the specific forms or arrangements of parts so described and illustrated. The embodiments are limited only by the appended claims.

What is claimed:

1. A building control system, comprising:
   a plurality of building sensor fixtures, at least one of the plurality of building sensor fixtures comprising a sensor, a controller and a communication port; and
   a system controller, wherein at least one of the system controller and one or more controllers of the plurality of building sensor fixtures is operative to:
   determine a plurality of selected groups of the plurality of building sensor fixtures, the plurality of selected groups including a first logical group and a second logical group having commonality in sensing;
   compare a first characteristic between the plurality of the selected groups;
   identify deviations of the compared first characteristic between the plurality of the selected groups, wherein the first logical group includes building sensor fixtures located within a room, and the second logical group includes a building sensor fixture within the room and another building sensor fixture located outside of the room; and
   at least one of adjust an operating parameter of one or more of the plurality of selected groups based on the identified deviations, or provide a system user with suggestions for physical changes to a structure associated with the building control system based on the identified deviations, wherein the building sensor fixtures of the first logical group and the building sensor fixture within the room of the second logical group each ignores its own sensing of motion or light in response to motion or light detection by both building sensor fixtures of the second logical group.

2. The building control system of claim 1, wherein the identified deviation includes a deviation of energy consumed by one of the plurality of selected groups compared to energy consumed by another of the plurality of selected groups.

3. The building control system of claim 1, wherein the identified deviation includes a deviation of occupancy use of one of the plurality of selected groups compared to occupancy use of another of the plurality of selected groups.

4. The building control system of claim 1, wherein the identified deviation includes a deviation of productivity of occupants of one of the plurality of selected groups compared productivity of occupants of another of the plurality of selected groups.

5. The building control system of claim 1, wherein the identified deviation includes a deviation occupant interaction of one of the plurality of selected groups compared occupant interaction of occupants of another of the plurality of selected groups.

6. The building control system of claim 1, wherein the identified deviation includes a deviation of utilization of space of one of the plurality of selected groups compared utilization of space of occupants of another of the plurality of selected groups.

7. The building control system of claim 1, further comprising selecting the first characteristic.

8. The building control system of claim 7, further comprising selecting the first characteristic based on achieving a desired result within a building associated with the building control system.

9. The building control system of claim 7, wherein the first characteristic is adaptively selected based on the determine plurality of groups of the plurality of building sensor fixtures.

10. The building control system of claim 1, wherein determining the plurality of groups of the plurality of building sensor fixtures comprises selecting the plurality of groups based on a second characteristic.

11. The building control system of claim 10, further comprising selecting the second characteristic based on achieving a desired result within a building associated with the building control system.

12. The building control system of claim 10, wherein the second characteristic is selected based upon observed correlations between sensed values of each of the plurality of building sensor fixtures.

13. The building control system of claim 10, wherein the second characteristic is selected based upon identification of operating behaviors of each of the building sensors of each group being within threshold ranges.

14. The building control system of claim 10, wherein the second characteristic is selected based upon the first characteristic.

15. The building control system of claim 10, wherein the first characteristic is selected based upon the second characteristic.

16. The building control system of claim 10, wherein the second characteristic is a same characteristic as the first characteristic.

17. The building control system of claim 1, wherein at least one building sensor fixture auto-designates a logical group based on location and/or proximity of a sensor that generates a sensed input.

18. A method of a building control system, comprising:
determining, at a system controller of the building control system, a plurality of selected groups of a plurality of building sensor fixtures, the plurality of selected groups including a first logical group and a second logical group having commonality in sensing;
comparing, at the system controller, a first characteristic between the plurality of the selected groups;
identifying, at the system controller, deviations of the compared first characteristic between the plurality of the selected groups, wherein the first logical group includes building sensor fixtures located within a room, and the second logical group includes a building sensor fixture within the room and another building sensor fixture located outside of the room; and
at least one of adjusting, at the system controller, an operating parameter of one or more of the plurality of selected groups based on the identified deviations, or providing, at the system controller, a system user with suggestions for physical changes to a structure associated with the building control system based on the identified deviations, wherein the building sensor fixtures of the first logical group and the building sensor fixture within the room of the second logical group each ignores its own sensing of motion or light in response to motion or light detection by both building sensor fixtures of the second logical group.

19. A building control system, comprising:
a plurality of building sensor fixtures, at least one of the plurality of building sensor fixtures comprising a sensor, a controller and a communication port; and
a system controller, wherein at least one of the system controller and one or more controllers of the plurality of building sensor fixtures is operative to:
determine a plurality of selected groups of the plurality of building sensor fixtures, the plurality of selected groups including a first logical group and a second logical group having commonality in sensing;
compare a first characteristic between the plurality of the selected groups;
identify deviations of the compared first characteristic between the plurality of the selected groups, wherein:
the first logical group includes a first building sensor fixture that forecasts arrival of a user by utilizing information from at least one other building sensor fixture within the first logical group; and
the second logical group includes a second building sensor fixture that forecasts arrival of the user by utilizing information from at least one other building sensor fixture within the second logical group; and
at least one of adjust an operating parameter of one or more of the plurality of selected groups based on the identified deviations, or provide a system user with suggestions for physical changes to a structure associated with the building control system based on the identified deviations.

20. A method of a building control system, comprising:
determining, at a system controller of the building control system, a plurality of selected groups of a plurality of building sensor fixtures, the plurality of selected groups including a first logical group and a second logical group having commonality in sensing;
comparing, at the system controller, a first characteristic between the plurality of the selected groups;
identifying, at the system controller, deviations of the compared first characteristic between the plurality of the selected groups, wherein:
the first logical group includes a first building sensor fixture that forecasts arrival of a user by utilizing information from at least one other building sensor fixture within the first logical group; and
the second logical group includes a second building sensor fixture that forecasts arrival of the user by utilizing information from at least one other building sensor fixture within the second logical group; and
at least one of adjusting, at the system controller, an operating parameter of one or more of the plurality of selected groups based on the identified deviations, or providing, at the system controller, a system user with suggestions for physical changes to a structure associated with the building control system based on the identified deviations.

* * * * *